(12) United States Patent
Schumacher et al.

(10) Patent No.: US 10,036,852 B1
(45) Date of Patent: Jul. 31, 2018

(54) OPTICAL FIBER LASER CLEAVER ADAPTER

(71) Applicant: Domaille Engineering, LLC, Rochester, MN (US)

(72) Inventors: Gregory A Schumacher, Plainview, MN (US); Jill B Christie, St Charles, MN (US); Dean A Krueger, Dodge Center, MN (US)

(73) Assignee: Domaille Engineering, LLC, Rochester, MN (US)

( * ) Notice: Subject to any disclaimer, the term of this patent is extended or adjusted under 35 U.S.C. 154(b) by 0 days.

(21) Appl. No.: 15/629,549

(22) Filed: Jun. 21, 2017

Related U.S. Application Data

(60) Provisional application No. 62/404,546, filed on Oct. 5, 2016.

(51) Int. Cl.
*G02B 6/25* (2006.01)
*G02B 6/38* (2006.01)

(52) U.S. Cl.
CPC .............. *G02B 6/25* (2013.01); *G02B 6/3885* (2013.01)

(58) Field of Classification Search
CPC ................................ G02B 6/25; G02B 6/3885
See application file for complete search history.

(56) References Cited

U.S. PATENT DOCUMENTS

| | | | |
|---|---|---|---|
| 6,547,445 B2 | 4/2003 | Kiani | |
| 9,268,091 B2 | 2/2016 | Jong et al. | |
| 9,304,264 B2 | 4/2016 | Bowen et al. | |
| 9,529,152 B2 | 12/2016 | James et al. | |
| 2002/0106161 A1 | 8/2002 | Kiani | |
| 2010/0215319 A1 | 8/2010 | Childers et al. | |
| 2012/0263423 A1 | 10/2012 | De Jong et al. | |
| 2014/0321809 A1 | 10/2014 | Bowen et al. | |
| 2015/0110454 A1 | 4/2015 | de Jong et al. | |
| 2015/0309266 A1* | 10/2015 | Childers | G02B 6/3885 156/250 |

OTHER PUBLICATIONS

AFL Telecommunications, "Fusion Splicing Systems: Fiber Holders" Data Sheet, © 2002, Revision 0, 4.01.05, p. 32.

(Continued)

*Primary Examiner* — Ryan Lepisto
(74) *Attorney, Agent, or Firm* — Dicke, Billig & Czaja, PLLC

(57) ABSTRACT

An optical fiber laser cleaver adapter assembly configured and arranged to receive at least two rows of optical fiber cables comprises an indexing guide, a base, and a fiber holder support. The indexing guide has an opening and at least one divider separating the opening into at least a first slot and a second slot. The base is configured and arranged to receive the indexing guide and has a window allowing access to at least a portion of the opening of the indexing guide. The fiber holder support is operatively connected to the base, and the fiber holder support is configured and arranged to receive the at least two rows of optical fiber cables and position the at least two rows of optical fiber cables to extend through the window and the respective at least first and second slots.

19 Claims, 43 Drawing Sheets

(56) References Cited

OTHER PUBLICATIONS

OpTek Systems, "LaserCleave™-1500LT, Improve performance, increase yield, reduce manufacturing costs" Data Sheet, www.opteksystems.com, 1 pg.
USCONEC PRIZM® LightTurn® Connector Data Sheet, © 2015 US Conec Ltd., SM-0010-1115, 2 pgs.
USCONEC MXC® Brand Connectors Data Sheet, © 2014 US Conec Ltd., Rev_1, 2 pgs.
USCONEC PRIZM® MT Ferrules Data Sheet, © 2015 US Conec Ltd., 2 pgs.
USCONEC Assembly, Laser Cleave, Jul. 16, 2013, 1 pg.

* cited by examiner

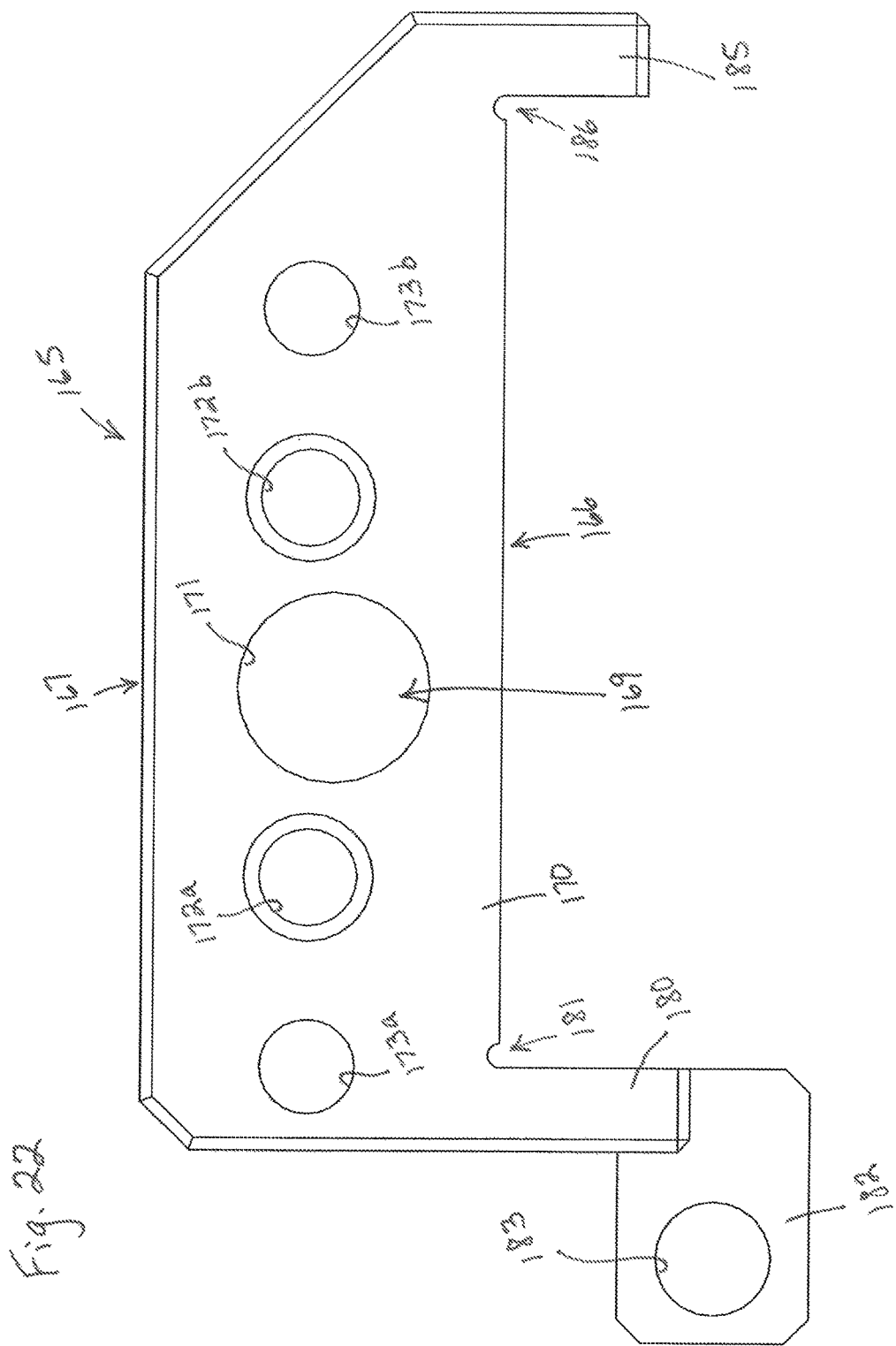

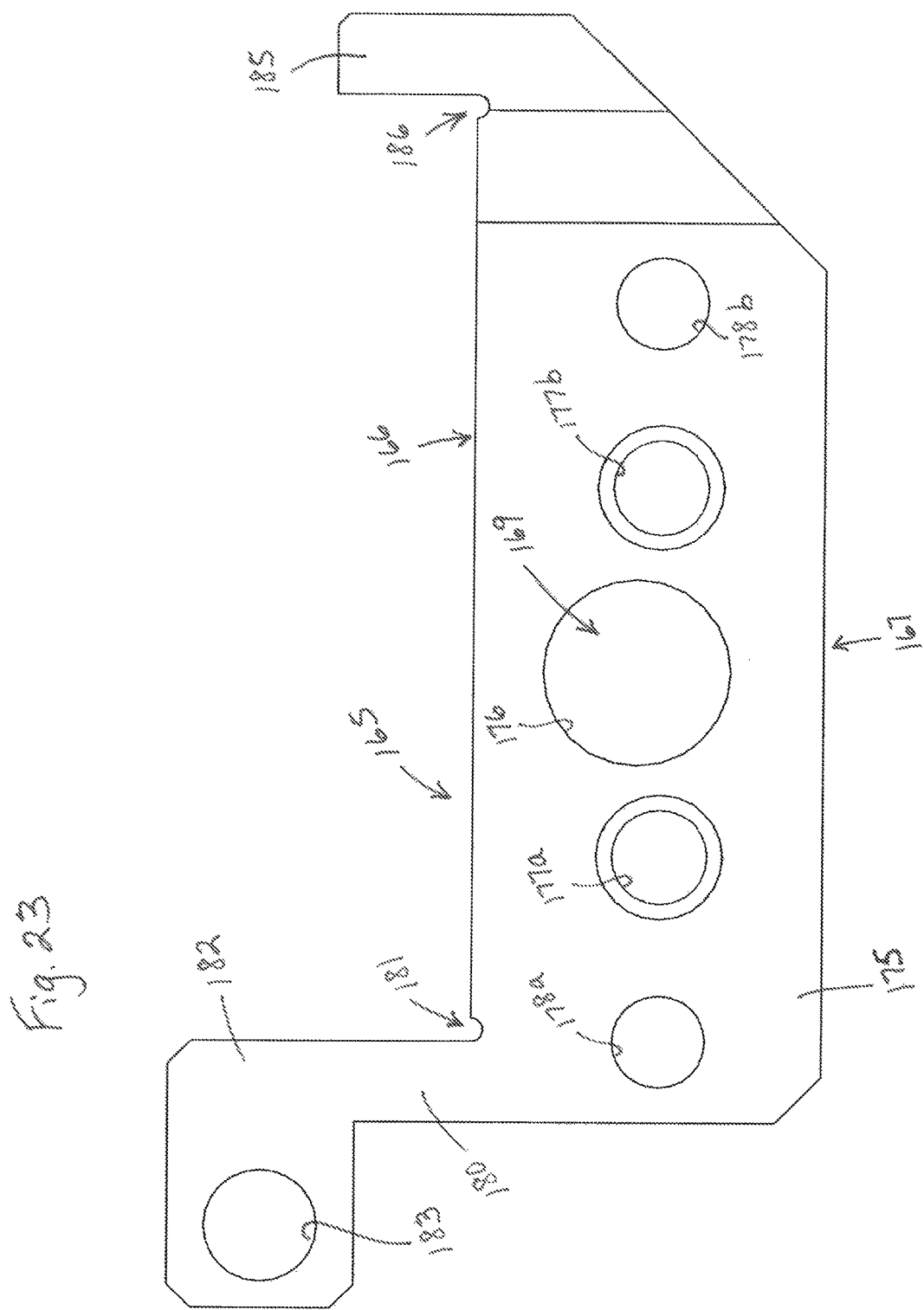

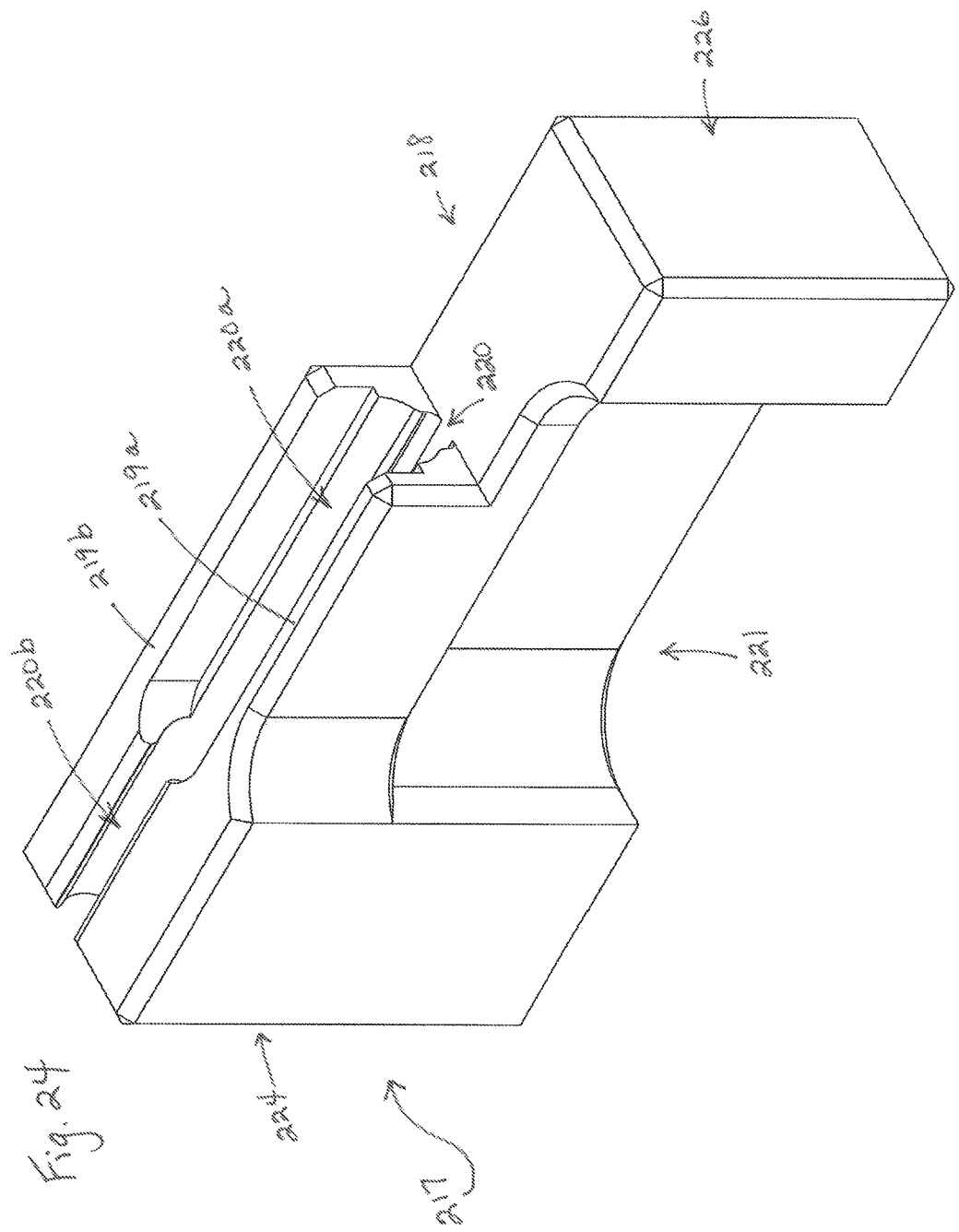

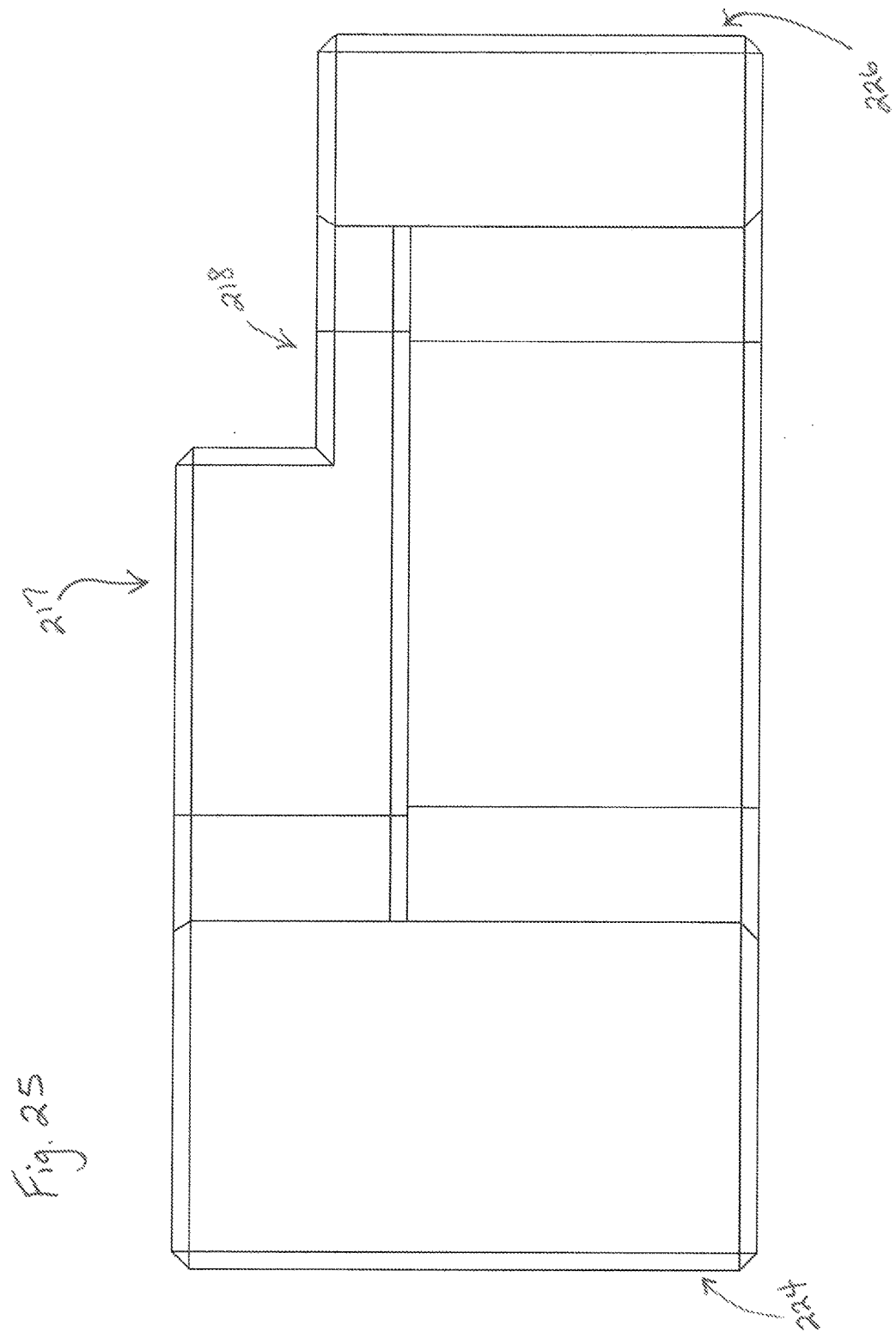

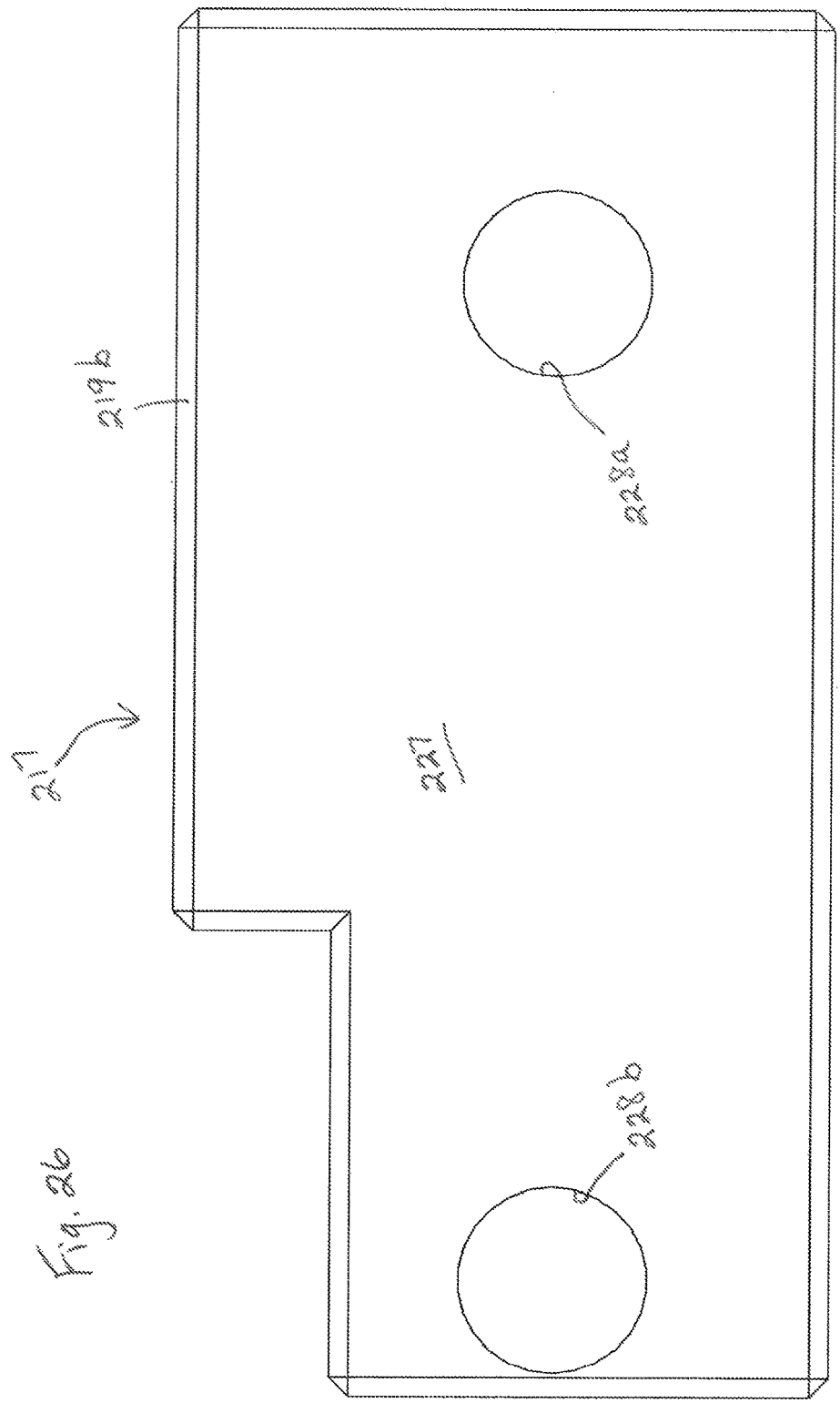

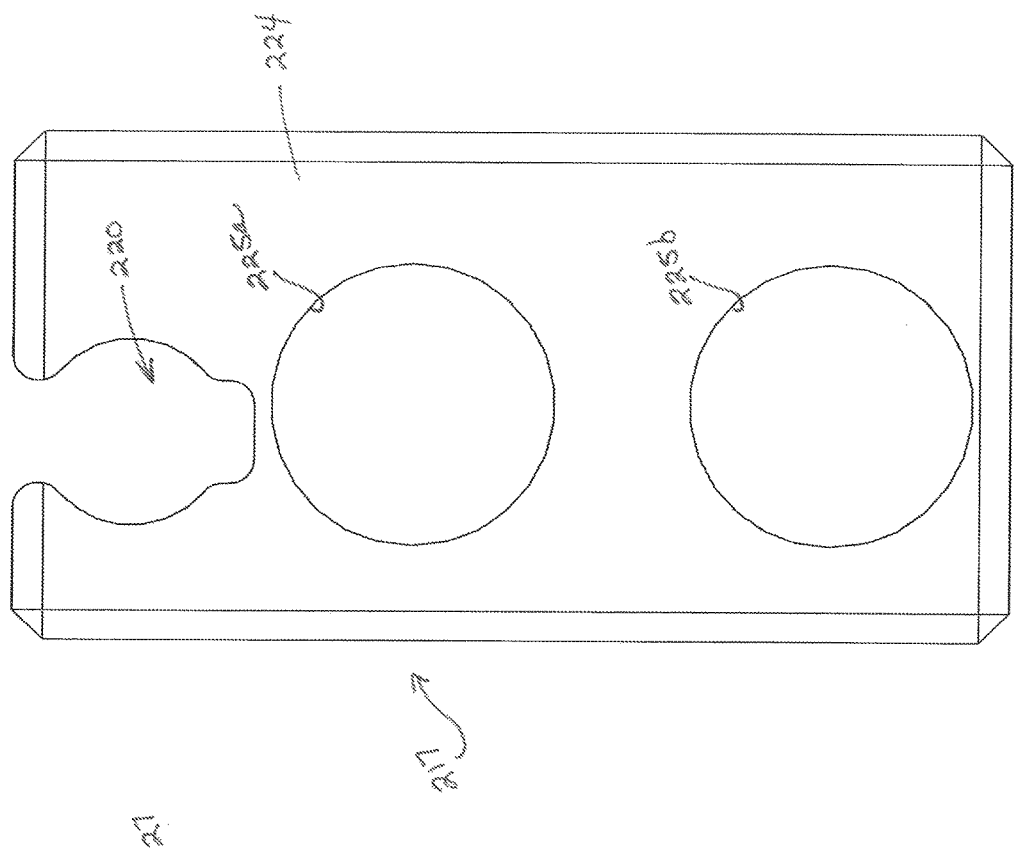

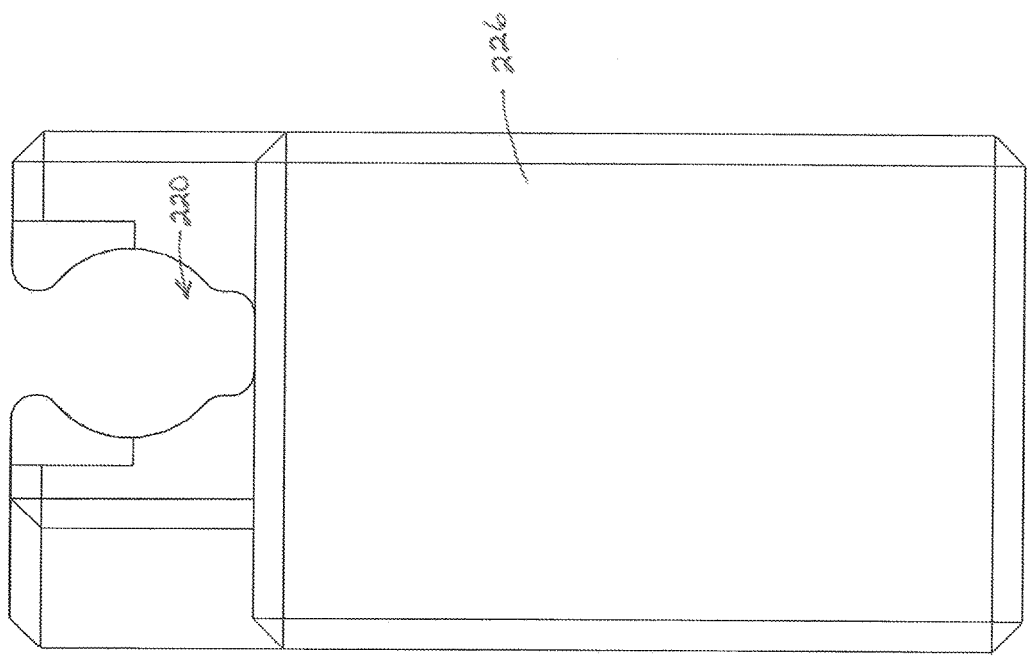

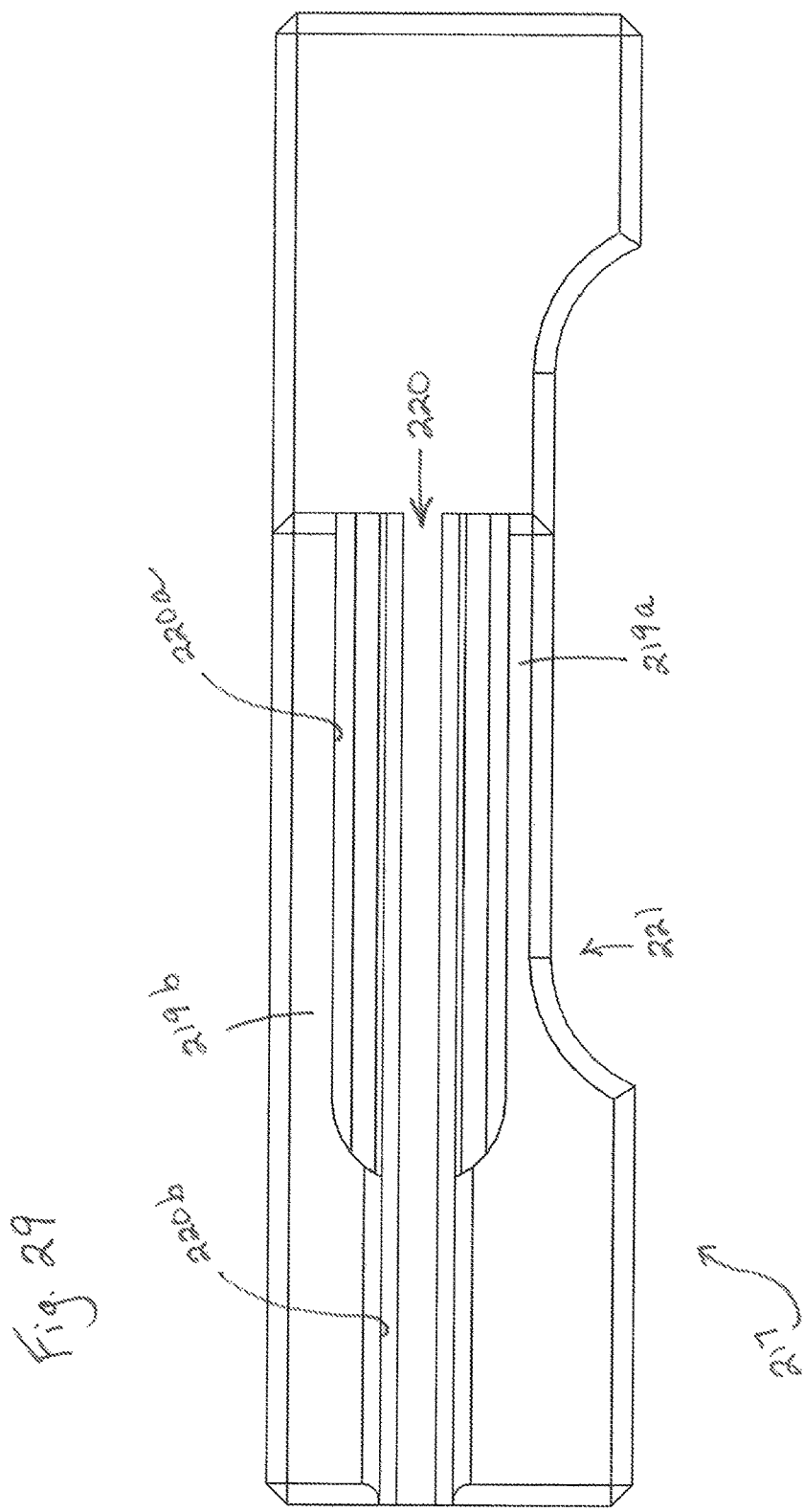

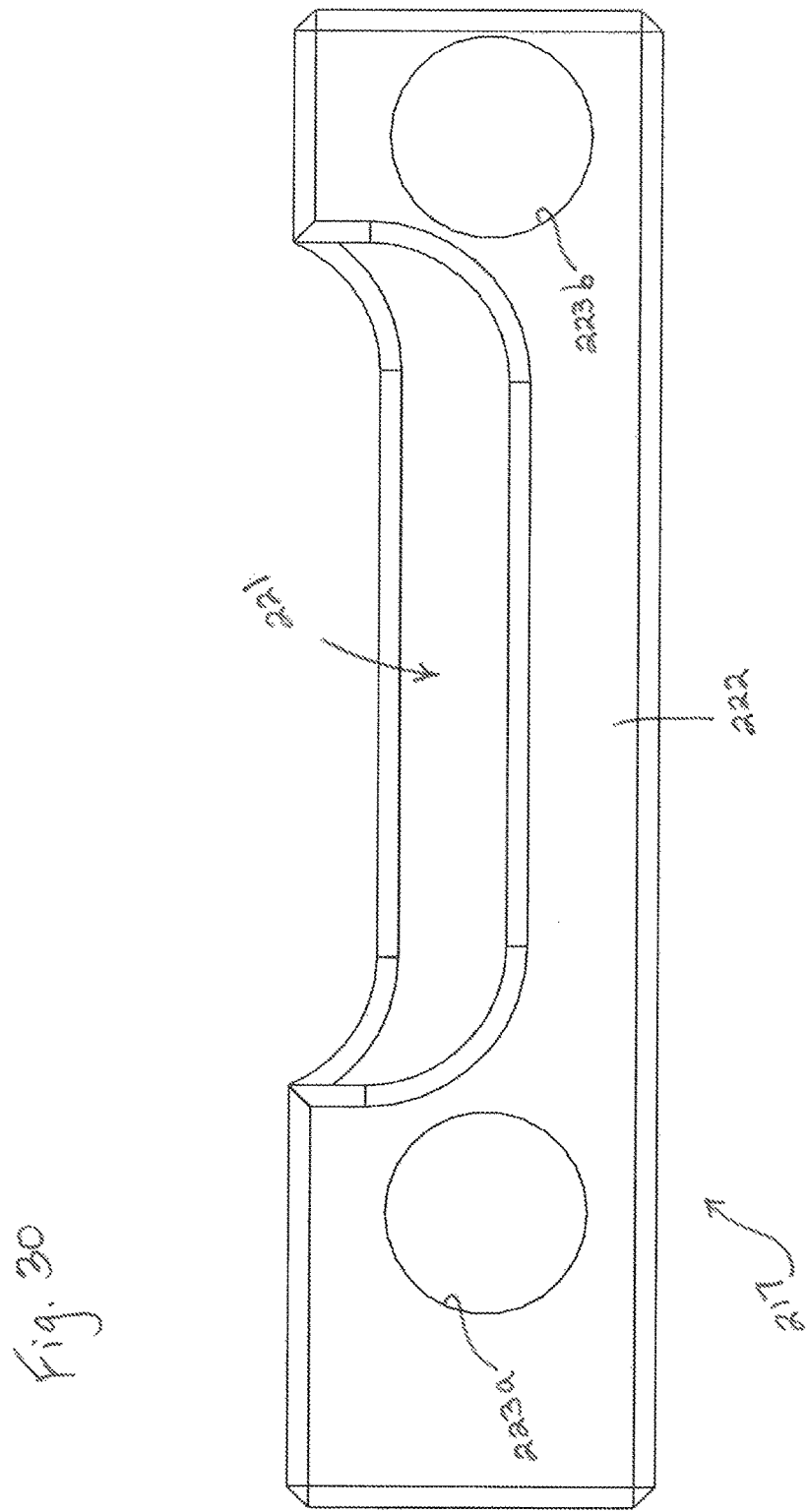

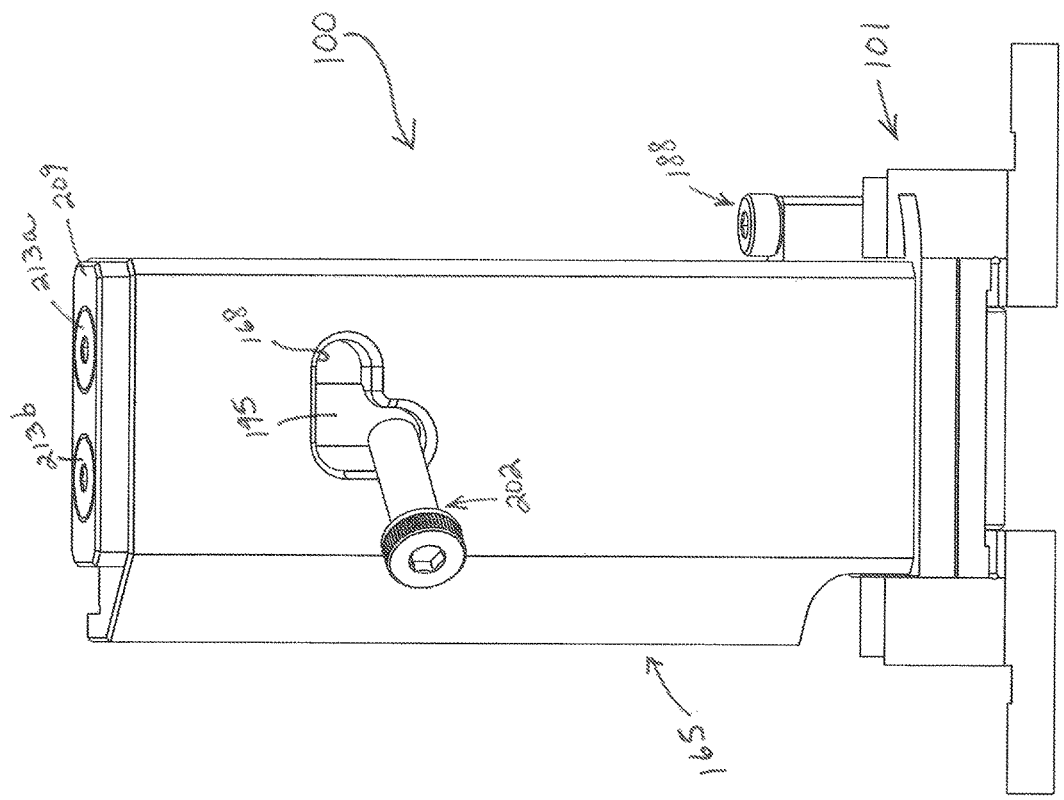

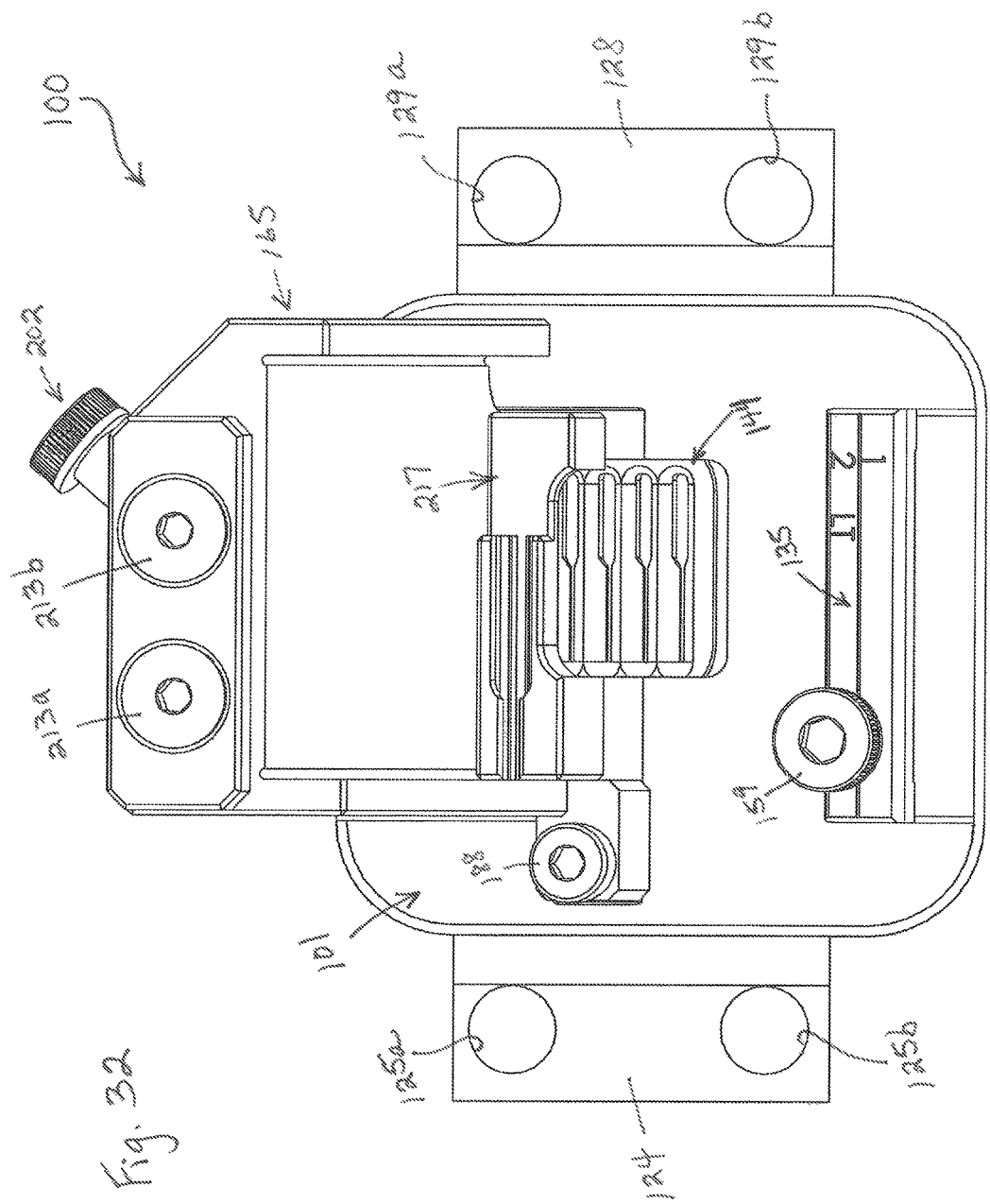

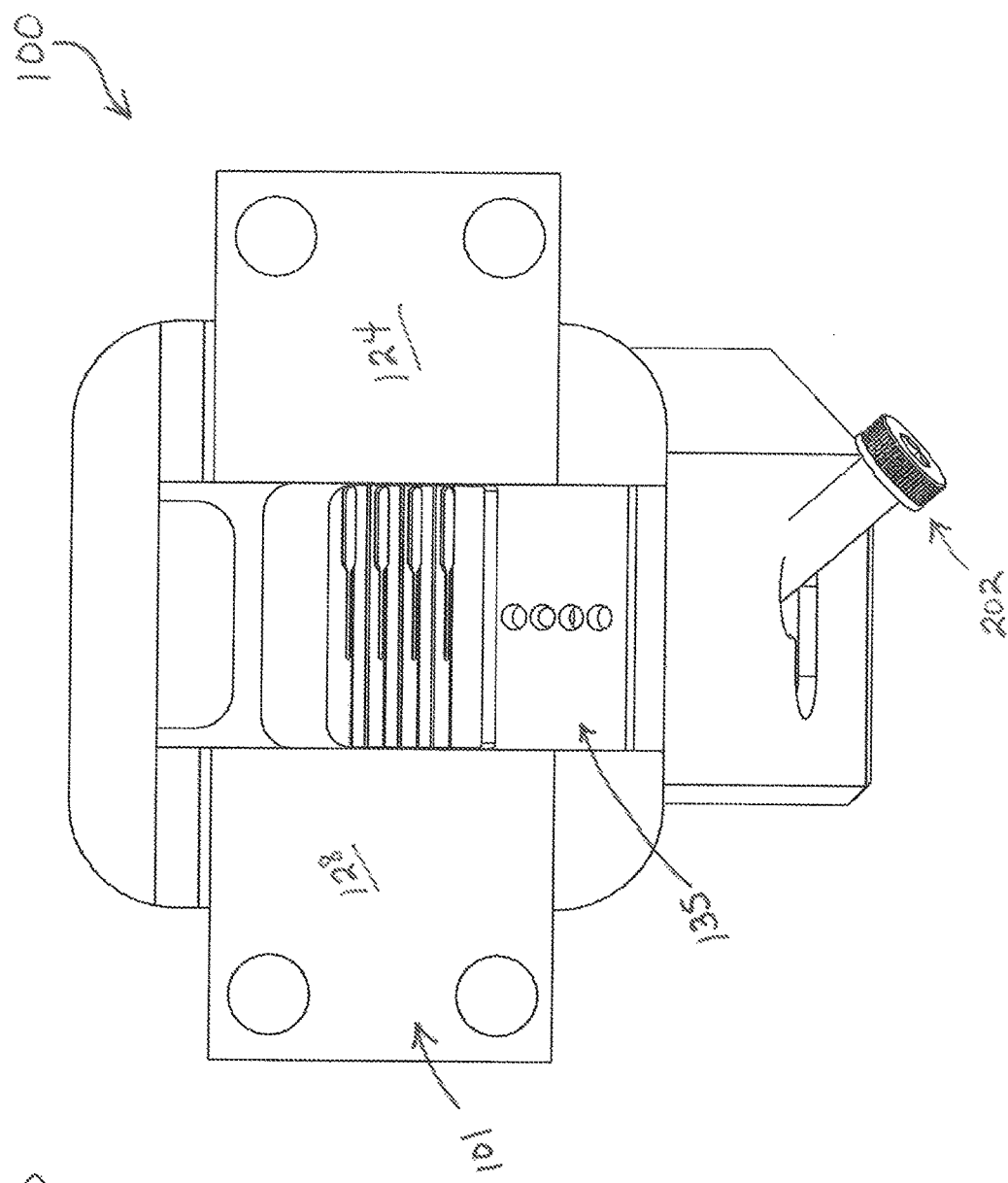

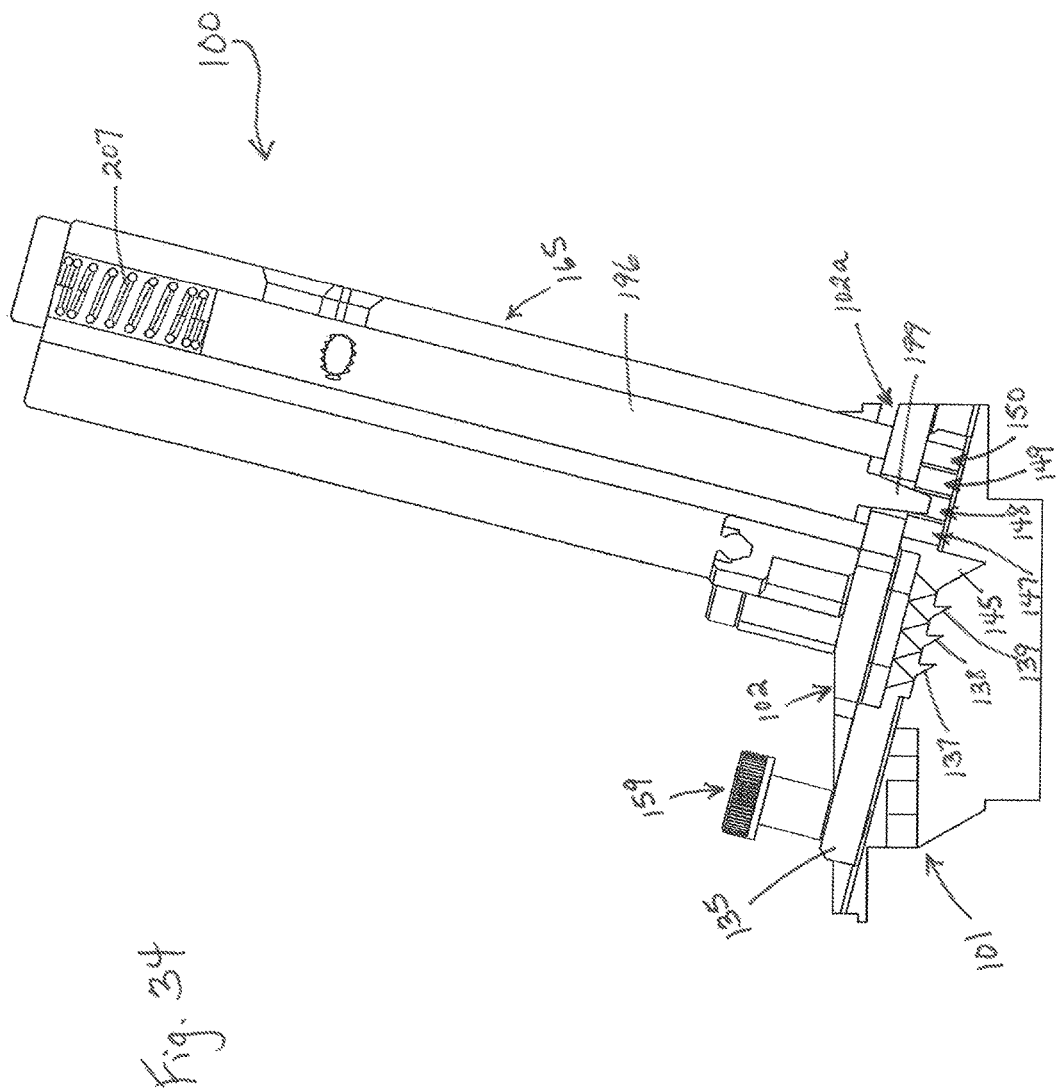

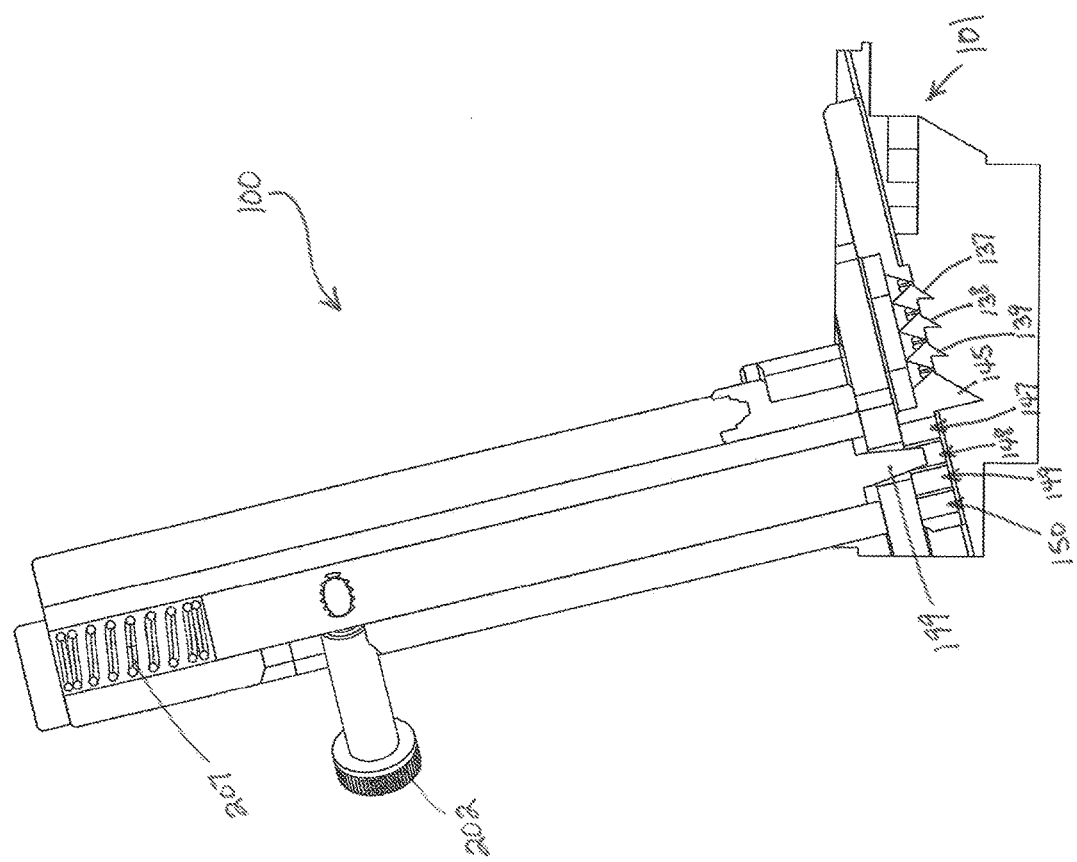

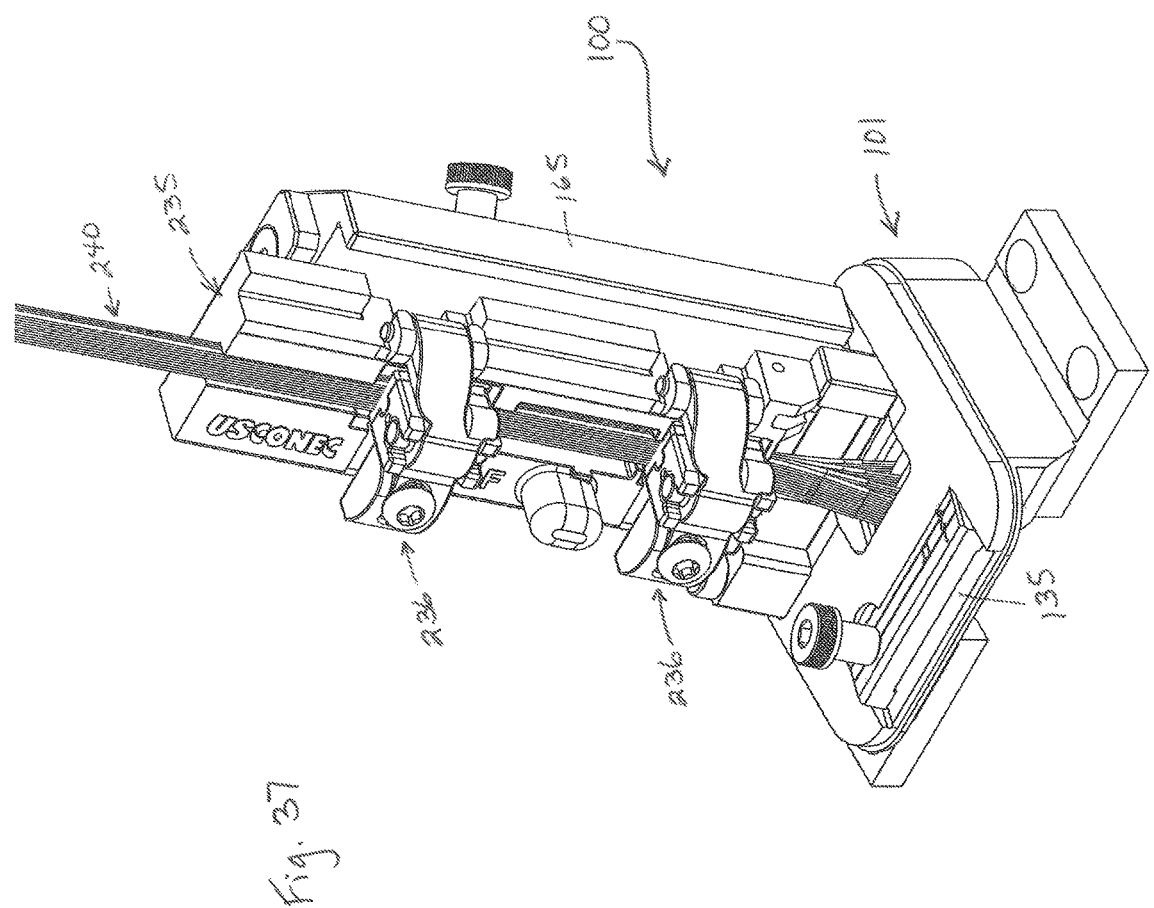

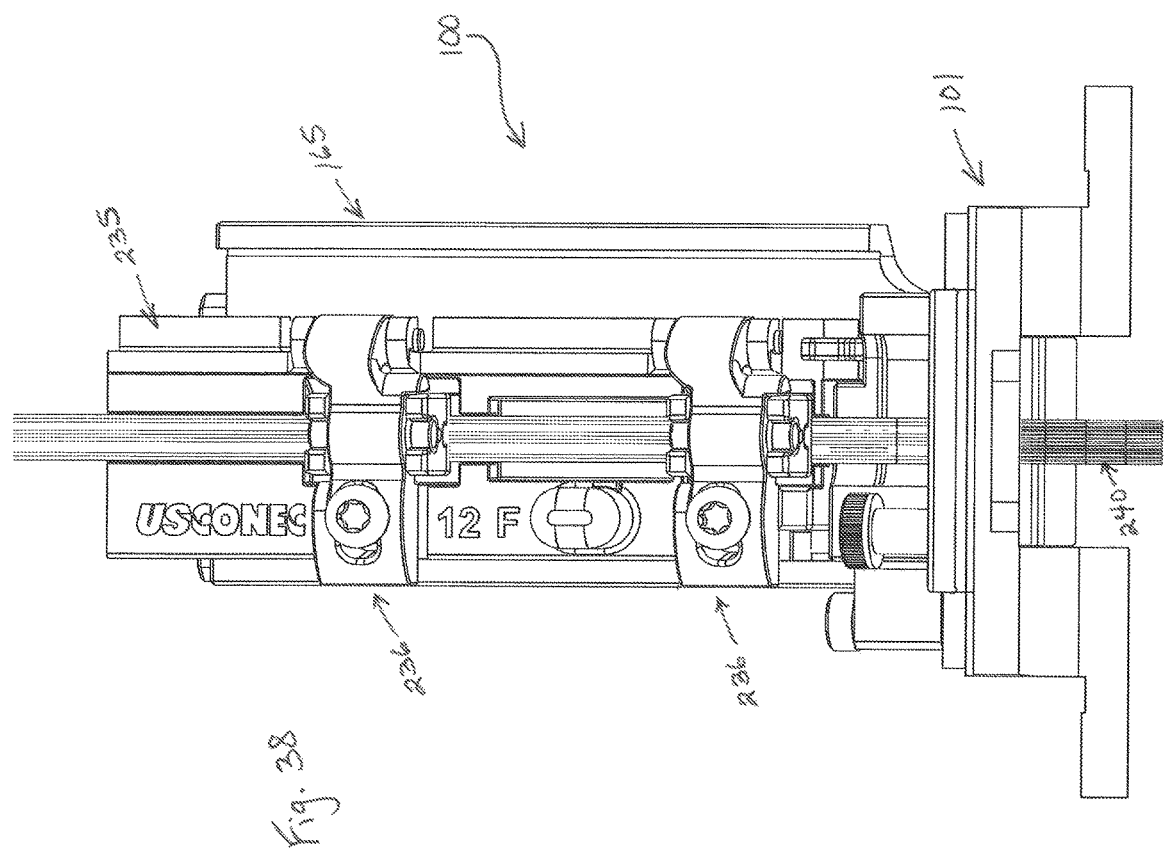

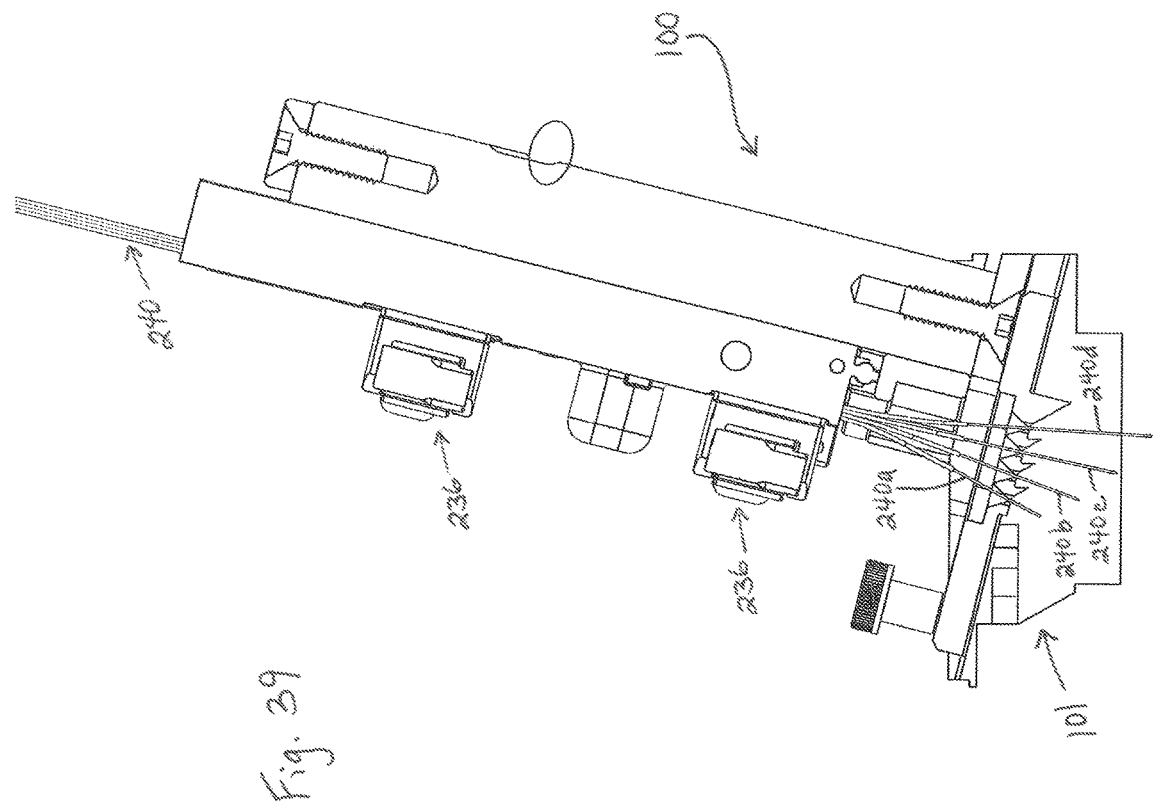

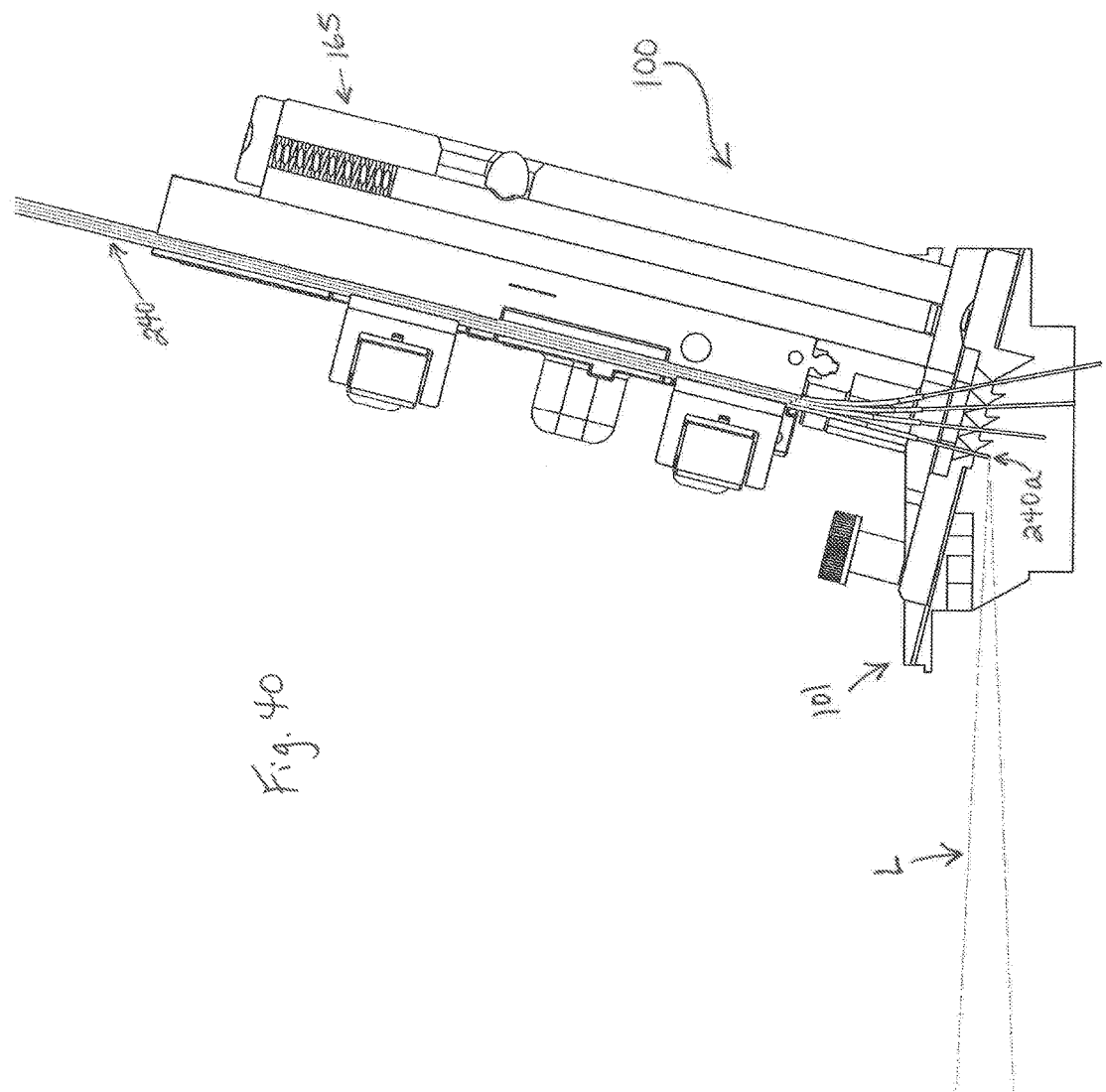

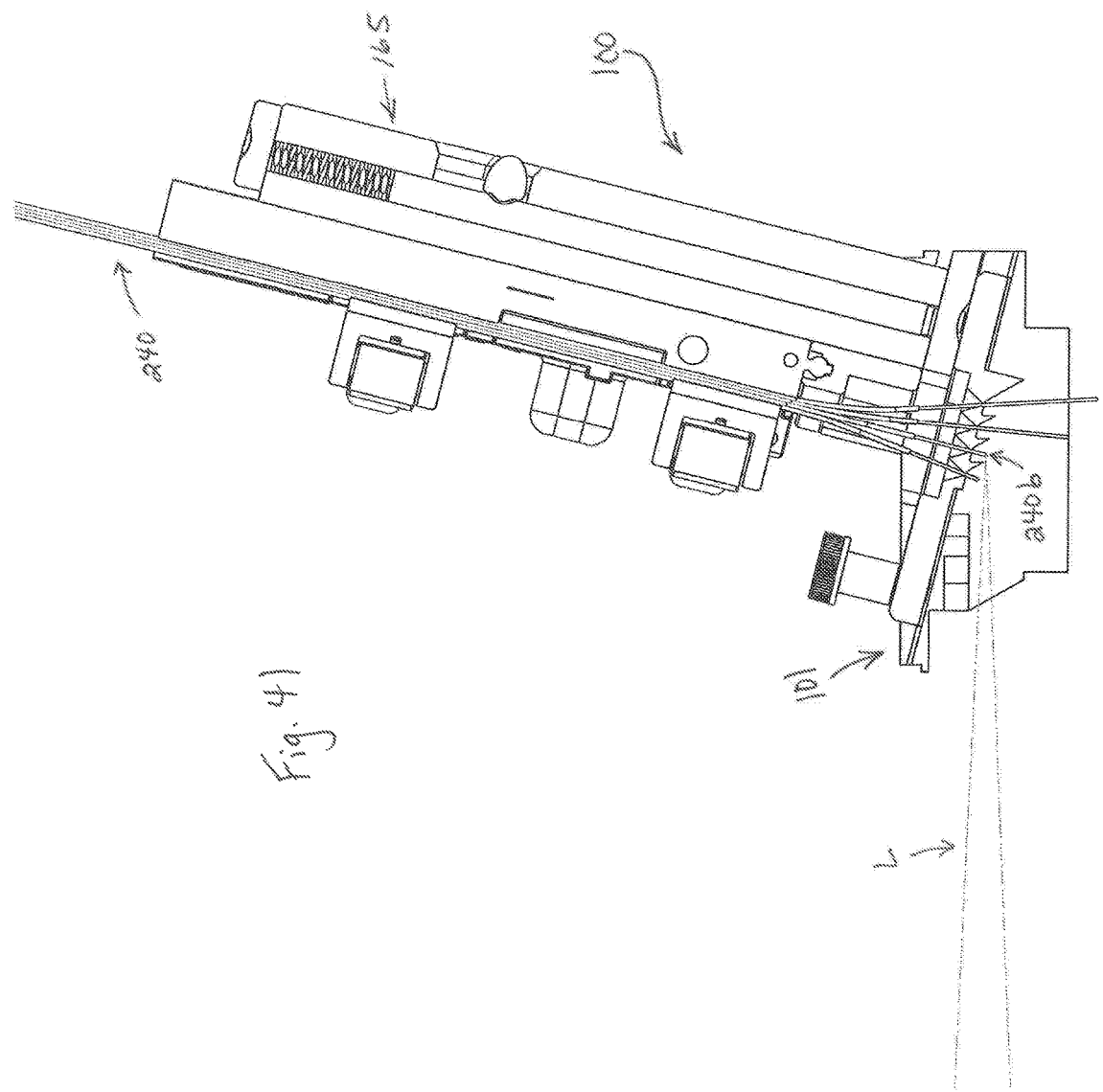

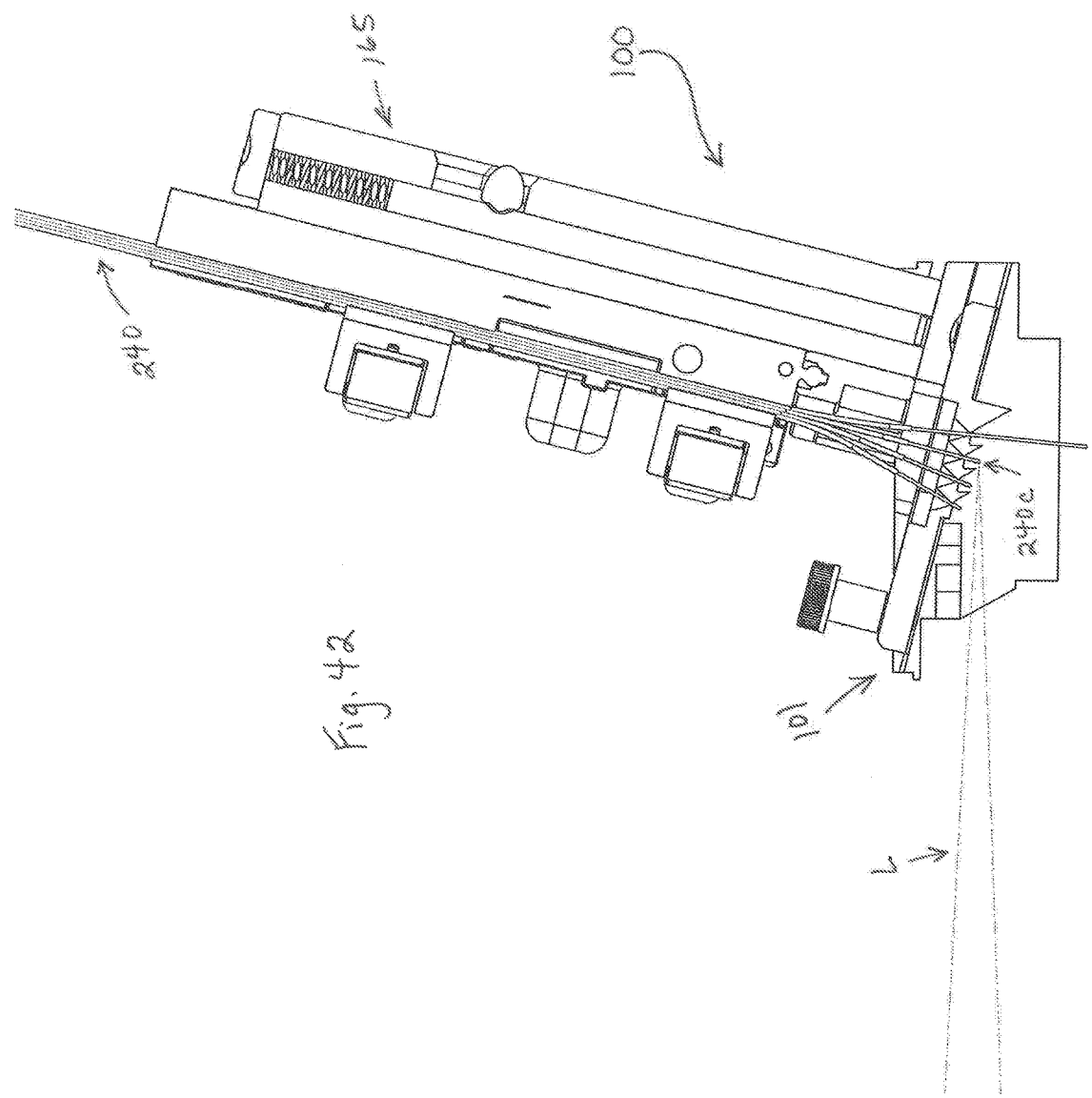

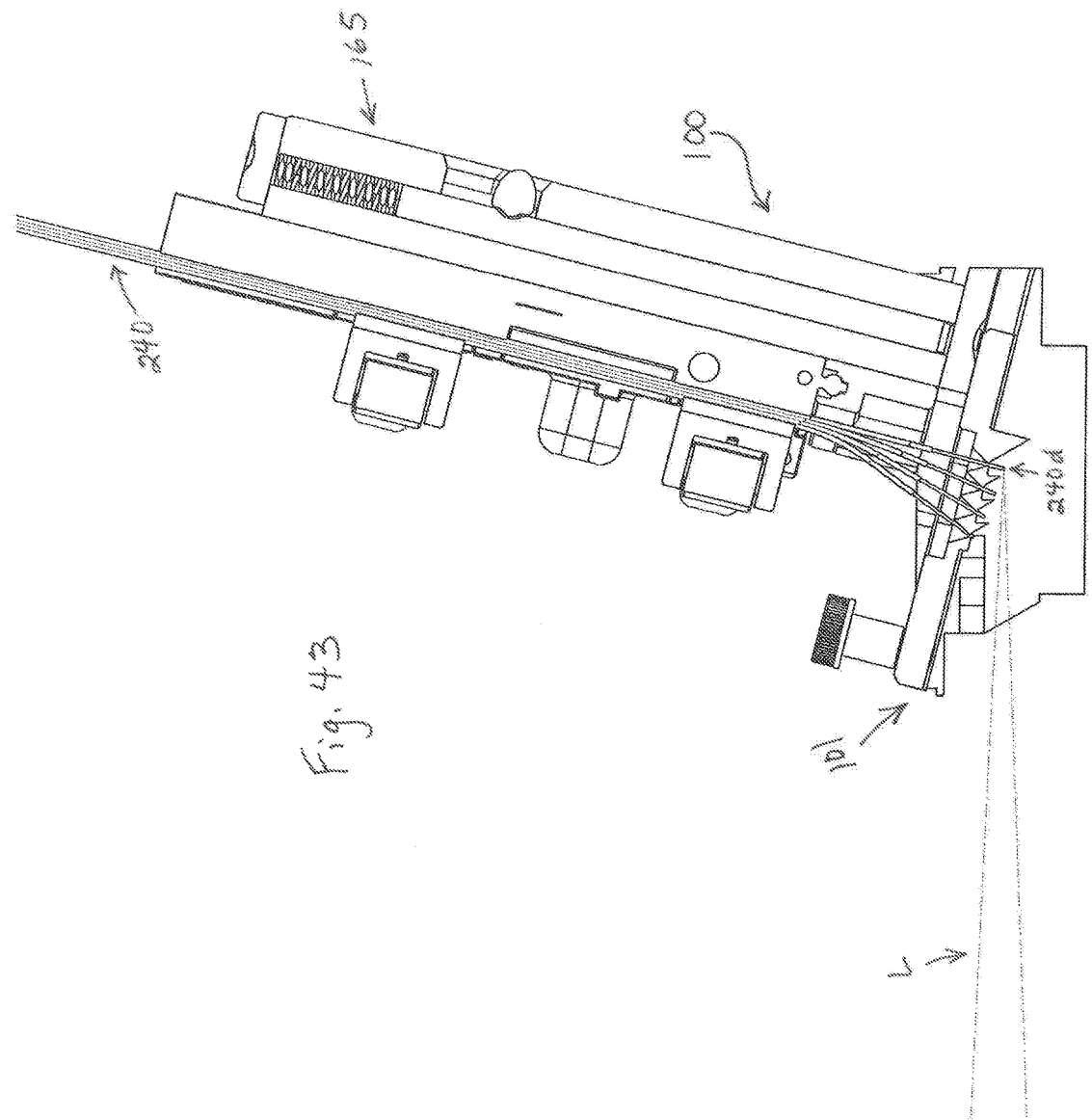

US 10,036,852 B1

OPTICAL FIBER LASER CLEAVER ADAPTER

This application claims the benefit of U.S. Provisional Patent Application 62/404,546, filed Oct. 5, 2016.

BACKGROUND OF THE INVENTION

A fiber optic cable or ribbon generally includes a protective or supporting material through which optical fibers extend. The cables or ribbons typically have connectors located on each end to connect them to other fiber optic cables or ribbons or to peripheral devices, and the connectors are high precision devices that position the optical fibers for optimal connection.

In order to pass light signals thru optical fibers, the end face of the connector (from which a ferrule and optical fibers extend) must abut an adjacent connector in a specific manner. The high tolerances required of the parts to make these connections lead to precise shaping of the ends of the optical fibers via cleaving, cutting, and/or polishing. Apex offset, radius of curvature, fiber protrusion/recession, and angularity are all geometric parameters of optical fiber ends face that play into the quality of the signal passing thru the ribbon. Final test measurements for back reflection and insertion loss are typically used as the final checks to determine the quality of the geometry (as well as the alignment, cleanliness, and surface finish of the finished cable.) As such, the end face is usually cleaved, cut and/or polished to exacting standards so as to produce a finished product with minimal back reflection and loss. For example, it is often necessary to cleave, cut, and/or polish the end face of the connector to a precise length, i.e., so the end face projects a predetermined amount from a reference point such as a shoulder on the fiber optic connector within a predetermined tolerance. Ribbons having multiple optical fibers can also be cleaved, cut, and/or polished to produce a particular performance specification.

For example, optical fiber laser cleavers allow ribbons to be processed quickly and generally include an adapter assembly capable of holding a fiber optic connector. In order to achieve the precision typically needed, the fiber optic connector is secured within the adapter assembly in such a way that the optical fibers protrude from the connector for contact with the laser.

Historically fiber optic ferrules have had holes going through the length of the ferrules so the optical fibers could go through the length of the ferrules. The fibers would be secured in the ferrules with epoxy, with the cut ends protruding out past the ferrules end-faces. The fibers would be cleaved close to the end-faces and then polished flush to the ends of the ferrules.

The PRIZM™ ferrules from US Conec have fiber holes that lead to stop planes. The fibers are secured in the holes with epoxy against the stop planes so the light from the fibers will transfer through the ferrules. The fibers being inserted in the PRIZM™ ferrules are cleaved so that all of the ends of all the fibers are relatively flat (maximum radius of curvature of the fibers end faces are ≥160 μm), square (end faces around the cores cannot be angled more than the given tolerance of <3.5°) and coplanar (all fiber lengths the same within 50 μm so they will all be against the stop planes when assembled). Ribbonized or stranded fibers can be used with the PRIZM™ ferrules. During the termination process of the PRIZM™ connectors, the optical fibers are held in fiber holders for the stripping, cleaving and epoxy processes. The multiple rows of fibers need to be clamped in a fiber holder (e.g., US Conec part#16513 for 12 fibers or part#16514 for 16 fibers) then separated so each row can be cleaved individually. The fibers are then repositioned for the next row to be cleaved. There are challenges in separating the ribbons and placing each row in a suitable position. This can be awkward and time-consuming.

The PRIZM™ LT (Light Turn) ferrule currently has a single row of 12 fiber holes, and there are no plans currently to add more configurations to the PRIZM™ LT ferrule.

The PRIZM™ MT ferrule platform supports fiber rows of 12 or 16 fibers and from 1 to 4 rows of fibers for fiber lane counts as high as 64. The PRIZM™ MT ferrule is then connectorized into the MXC Connector.

US Conec and Optek Systems currently sell a laser for cleaving the fiber for PRIZM™ ferrules. However, there are challenges in separating the ribbons and placing each row in a suitable position, and this can be awkward and time-consuming.

For the reasons stated above and for other reasons stated below, which will become apparent to those skilled in the art upon reading and understanding the present specification, there is a need in the art for an optical fiber laser cleaver adapter.

BRIEF SUMMARY OF THE INVENTION

The above-mentioned problems associated with prior devices are addressed by embodiments of the present invention and will be understood by reading and understanding the present specification. The following summary is made by way of example and not by way of limitation. It is merely provided to aid the reader in understanding some of the aspects of the invention.

In one embodiment, an optical fiber laser cleaver adapter assembly configured and arranged to receive at least two rows of optical fiber cables comprises an indexing guide, a base, and a fiber holder support. The indexing guide has an opening and at least one divider separating the opening into at least a first slot and a second slot. The base is configured and arranged to receive the indexing guide and has a window allowing access to at least a portion of the opening of the indexing guide. The fiber holder support is operatively connected to the base, and the fiber holder support is configured and arranged to receive the at least two rows of optical fiber cables and position the at least two rows of optical fiber cables to extend through the window and the respective at least first and second slots.

In one embodiment, an optical fiber laser cleaver adapter assembly configured and arranged to receive at least two rows of optical fiber cables comprises an indexing guide, a base, and a fiber holder support. The indexing guide has an opening and at least one divider separating the opening into at least a first slot and a second slot. The base is configured and arranged to receive the indexing guide and has a window allowing access to at least a portion of the opening of the indexing guide. The fiber holder support is operatively connected to the base and is configured and arranged to position the indexing guide in at least a first position and a second position relative to the base. The fiber holder support is configured and arranged to receive the at least two rows of optical fiber cables and position the at least two rows of optical fiber cables to extend through the window and the respective at least first and second slots, the first position positioning the first slot and thereby the first row of optical fiber cables in a desired location and the second position positioning the second slot and thereby the second row of optical fiber cables in the desired location.

BRIEF DESCRIPTION OF THE DRAWINGS

The present invention can be more easily understood, and further advantages and uses thereof can be more readily apparent, when considered in view of the detailed description and the following Figures in which:

FIG. 21 is a second side view of the fiber holder support shown in FIG. 17;

FIG. 22 is a top view of the fiber holder support shown in FIG. 17;

FIG. 23 is a bottom view of the fiber holder support shown in FIG. 17;

FIG. 24 is a front perspective view of a block of the optical fiber laser cleaver adapter assembly shown in FIG. 1;

FIG. 25 is a front view of the block shown in FIG. 24;

FIG. 26 is a rear view of the block shown in FIG. 24;

FIG. 27 is a first side view of the block shown in FIG. 24;

FIG. 28 is a second side view of the block shown in FIG. 24;

FIG. 29 is a top view of the block shown in FIG. 24;

FIG. 30 is a bottom view of the block shown in FIG. 24;

FIG. 32 is a top view of the optical fiber laser cleaver adapter assembly shown in FIG. 1;

FIG. 33 is a bottom view of the optical fiber laser cleaver adapter assembly shown in FIG. 1;

FIG. 34 is a first side cross section view of the optical fiber laser cleaver adapter assembly shown in FIG. 1;

FIG. 35 is a second side cross section view of the optical fiber laser cleaver adapter assembly shown in FIG. 1;

FIG. 37 is a front perspective view of the optical fiber laser cleaver adapter assembly with the optical fiber cable assembly shown in FIG. 36 with the optical fiber cable assembly extending through the indexing guide;

FIG. 38 is a front view of the optical fiber laser cleaver adapter assembly with the optical fiber cable assembly extending through the indexing guide shown in FIG. 37;

FIG. 39 is a first side partial cross section view of the optical fiber laser cleaver adapter assembly with the optical fiber cable assembly extending through the indexing guide shown in FIG. 37;

FIG. 40 is a first side partial cross section view of the optical fiber laser cleaver adapter assembly with the optical fiber cable assembly extending through the indexing guide shown in FIG. 39 and a laser cutting a first row of optical fiber cables;

FIG. 41 is a first side partial cross section view of the optical fiber laser cleaver adapter assembly with the optical fiber cable assembly extending through the indexing guide shown in FIG. 39 and a laser cutting a second row of optical fiber cables;

FIG. 42 is a first side partial cross section view of the optical fiber laser cleaver adapter assembly with the optical fiber cable assembly extending through the indexing guide shown in FIG. 39 and a laser cutting a third row of optical fiber cables; and FIG. 43 is a first side partial cross section view of the optical fiber laser cleaver adapter assembly with the optical fiber cable assembly extending through the indexing guide shown in FIG. 39 and a laser cutting a fourth row of optical fiber cables.

In accordance with common practice, the various described features are not drawn to scale but are drawn to emphasize specific features relevant to the present invention. Reference characters denote like elements throughout the Figures and the text.

DETAILED DESCRIPTION OF THE INVENTION

Figure 1:
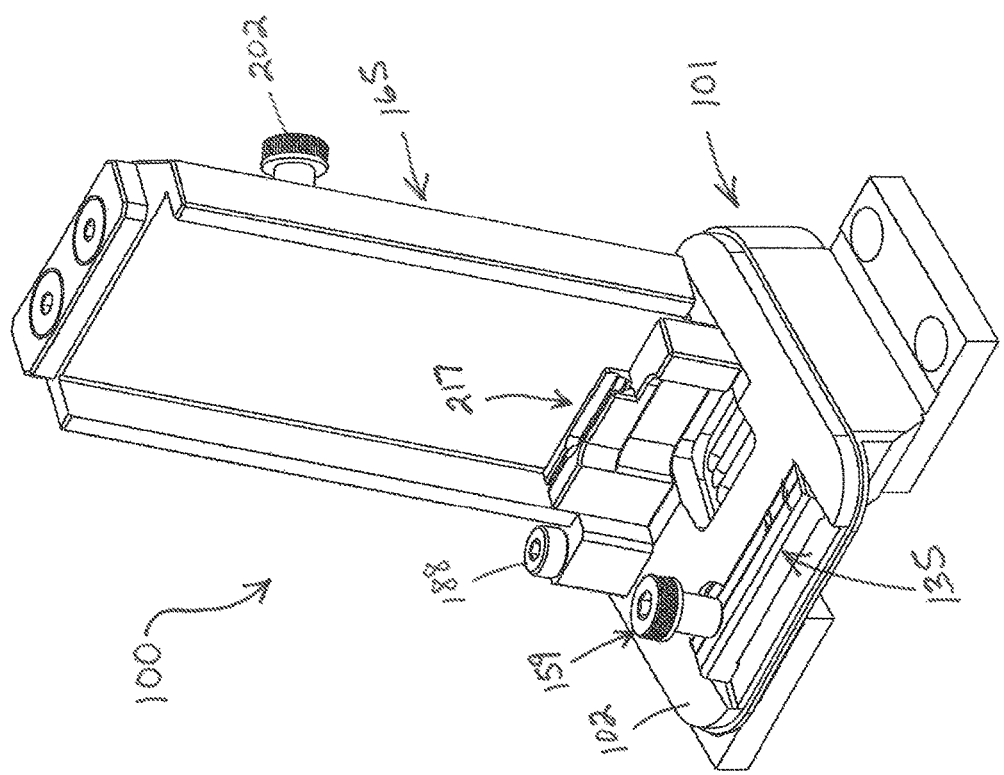
FIG. 1 is a front perspective view of an optical fiber laser cleaver adapter assembly constructed in accordance with the principles of the present invention.

In the following detailed description, reference is made to the accompanying drawings, which form a part hereof, and in which is shown by way of illustration embodiments in which the inventions may be practiced. These embodiments are described in sufficient detail to enable those skilled in the art to practice the invention, and it is to be understood that other embodiments may be utilized and mechanical changes may be made without departing from the spirit and scope of the present invention. The following detailed description is, therefore, not to be taken in a limiting sense, and the scope of the present invention is defined only by the claims and equivalents thereof.

Embodiments of the present invention provide an optical fiber laser cleaver adapter assembly. Generally, the adapter assembly allows the user to cleave two or more rows of fibers without having to remove the fiber handler to reposition the next row of fibers. An indexing guide positions each row of fibers so that only one row of fibers is cleaved at a time.

In an embodiment, an optical fiber laser cleaver adapter assembly 100 includes a base 101, an indexing guide 135, a fiber holder support 165, and a positioning member 195.

The base 101 is configured and arranged to be mounted onto a housing of a laser cleaver. The base is shown in FIGS. 3-9. The base 101 includes a top portion 102, a bottom portion 118, a side 113, and a side 116 forming a channel 132 therebetween configured and arranged to receive the indexing guide 135. The top portion 102 includes a ramped portion 102a that slopes downward from proximate a middle to a rear side of the top portion 102. Proximate the rear side, the ramped portion 102a includes a center aperture 104 with an intermediate aperture 105a proximate one side of the center aperture 104 and an outer aperture 106a on the other side of the intermediate aperture 105a and with an intermediate aperture 105b proximate the other side of the center aperture 104 and an outer aperture 106b on the other side of the intermediate aperture 105b. The ramped portion 102a formed a holder receiver 110 configured and arranged to receive the holder support 165. The top portion 102 includes a window 103 proximate the middle that provides access to the channel 132. The window 103 is offset from center more proximate side 116, and a side threaded aperture 107 is between side 113 and the window 103. A front side of the top portion 102 includes notched portion 108 with a handle receiver 109. Proximate the side 113, the top portion 102 includes a lateral slot 114. The bottom portion 118 includes a notch 119 generally aligned with the window 103. A connecting flange 124 is operatively connected to the bottom portion 118, extends outward proximate the side 113, and includes apertures 125a and 125b. A connecting flange 128 is operatively connected to the bottom portion 118, extends outward proximate the side 116, and includes apertures 129a and 129b.

Figure 13:
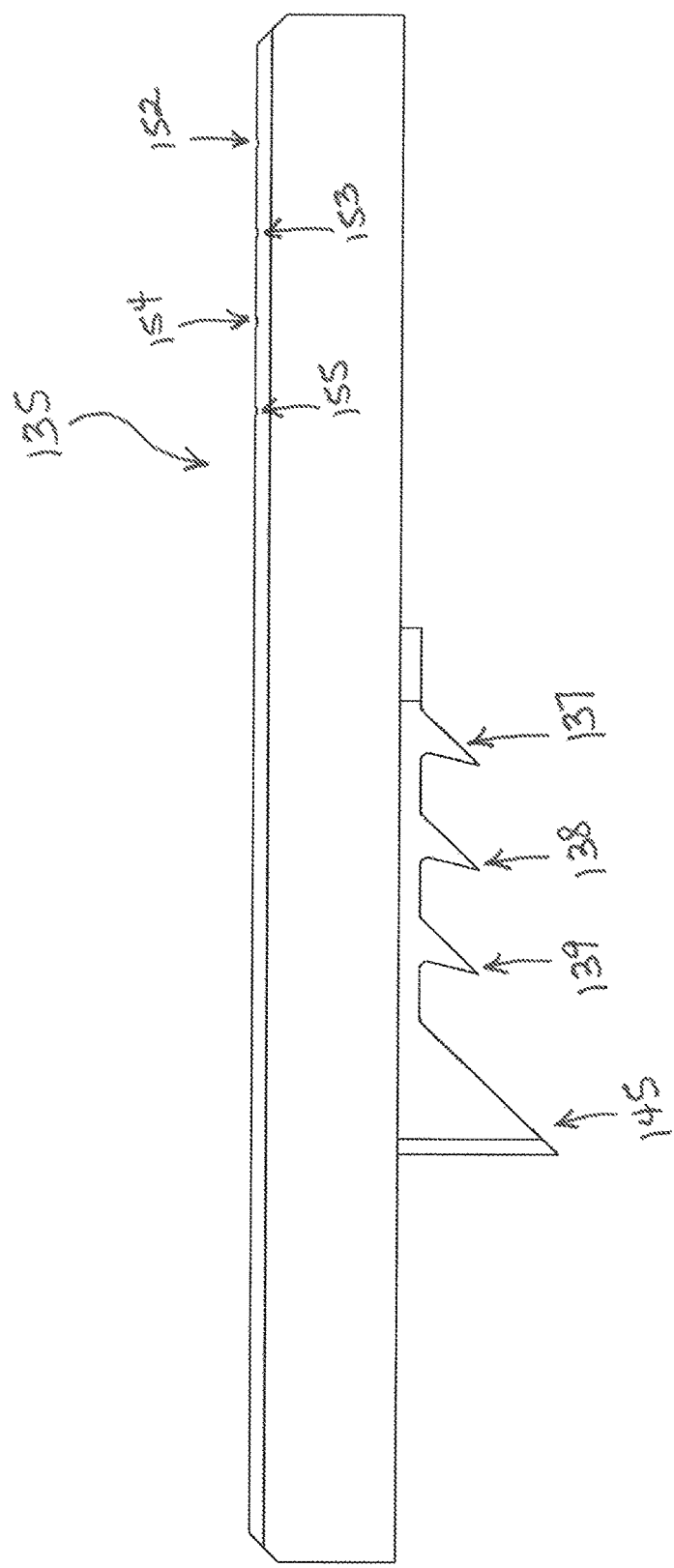
FIG. 13 is a first side view of the indexing guide shown in FIG. 10.
Figure 14:
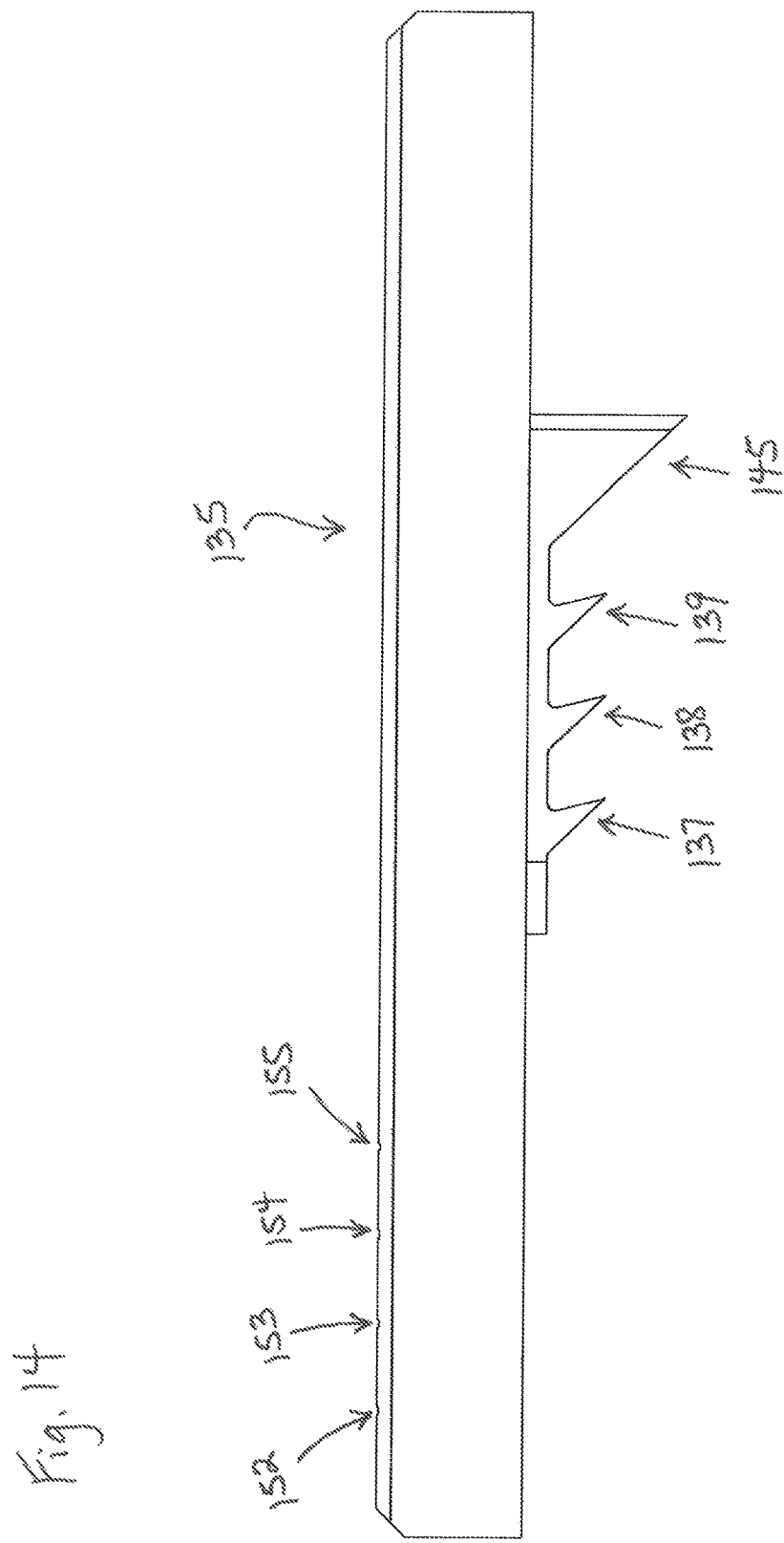
FIG. 14 is a second side view of the indexing guide shown in FIG. 10.
Figure 15:
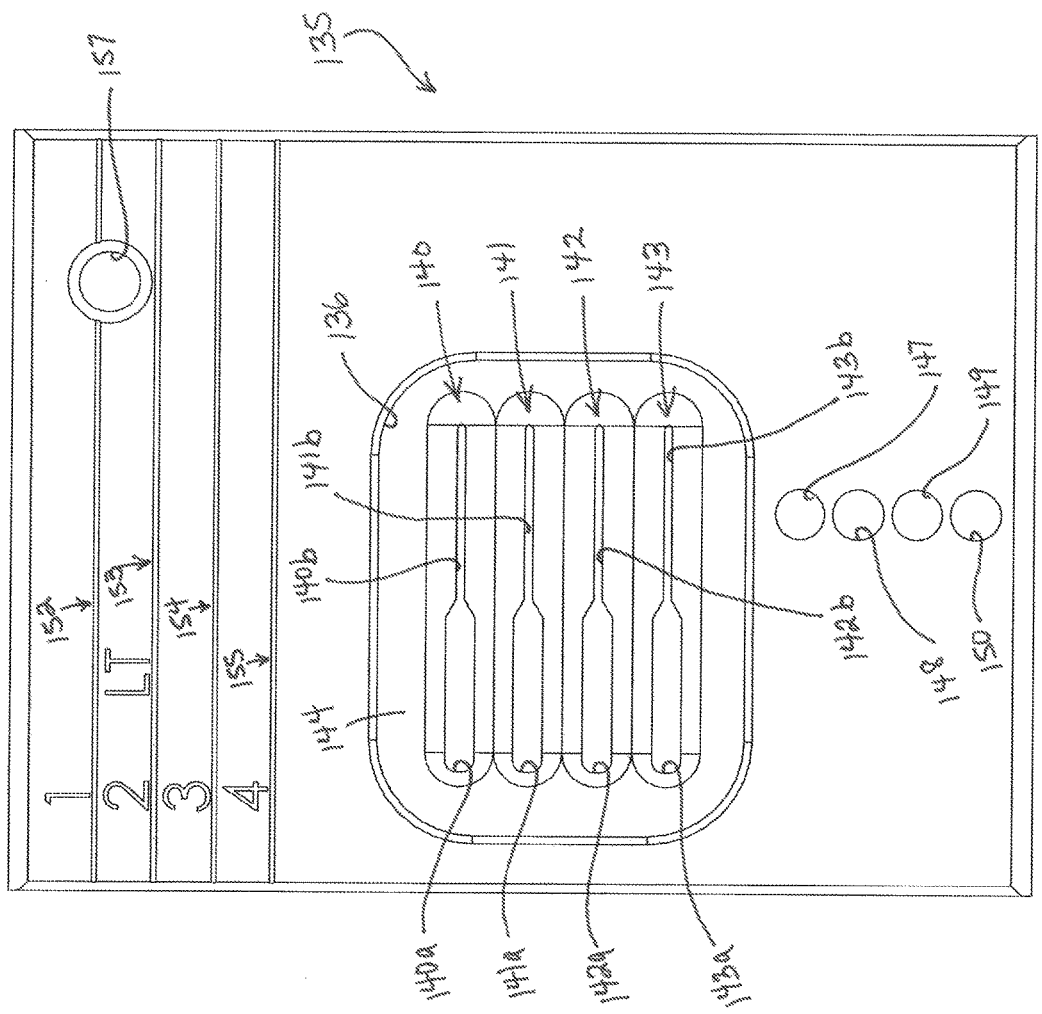
FIG. 15 is a top view of the indexing guide shown in FIG. 10.
Figure 16:
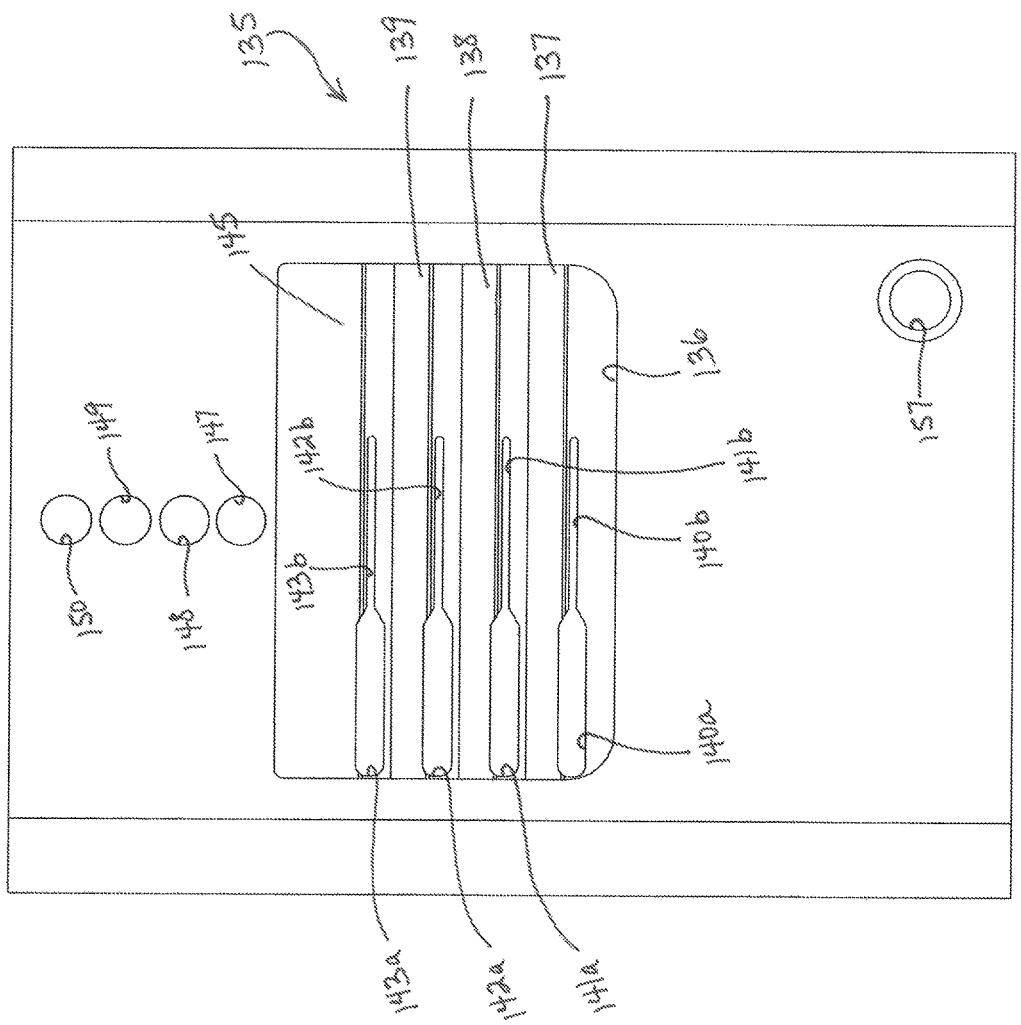
FIG. 16 is a bottom view of the indexing guide shown in FIG. 10.
Figure 17:
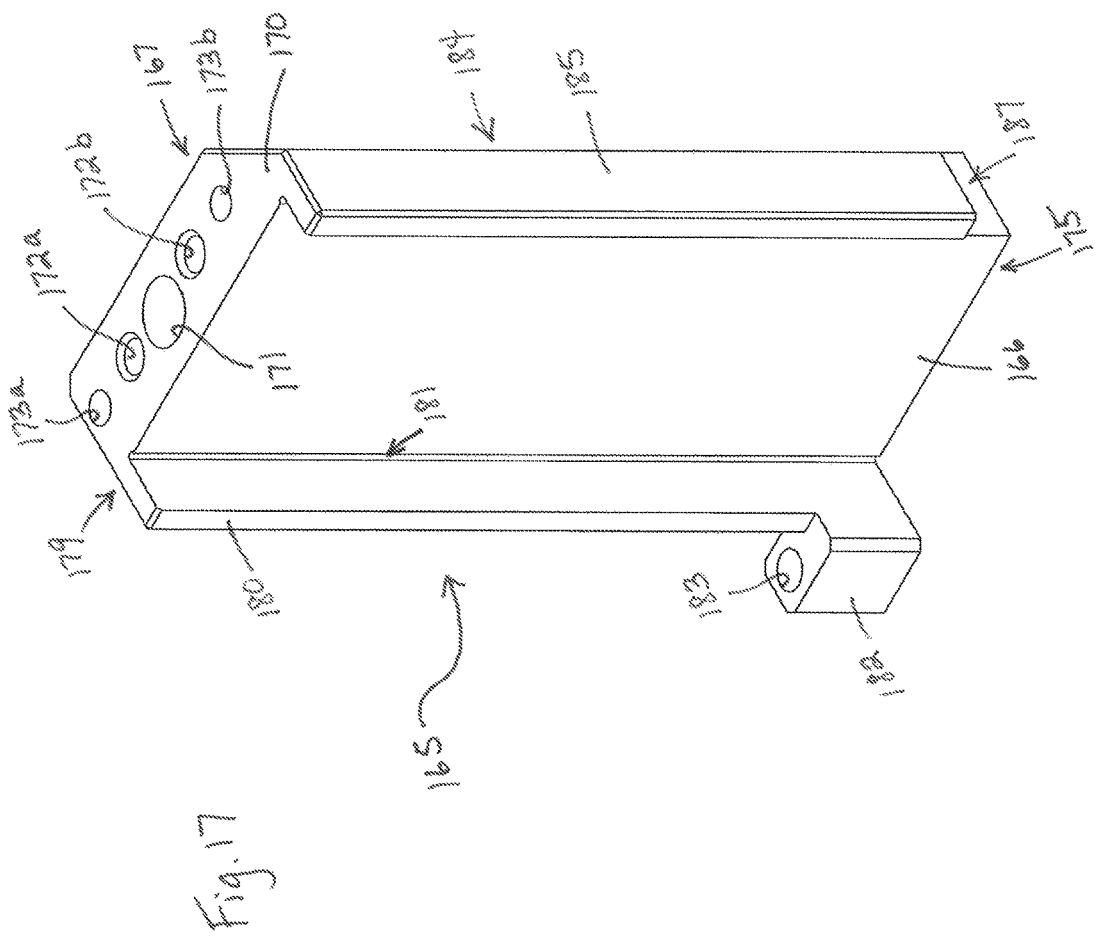
FIG. 17 is a front perspective view of a fiber holder support of the optical fiber laser cleaver adapter assembly shown in FIG. 1.
Figure 18:
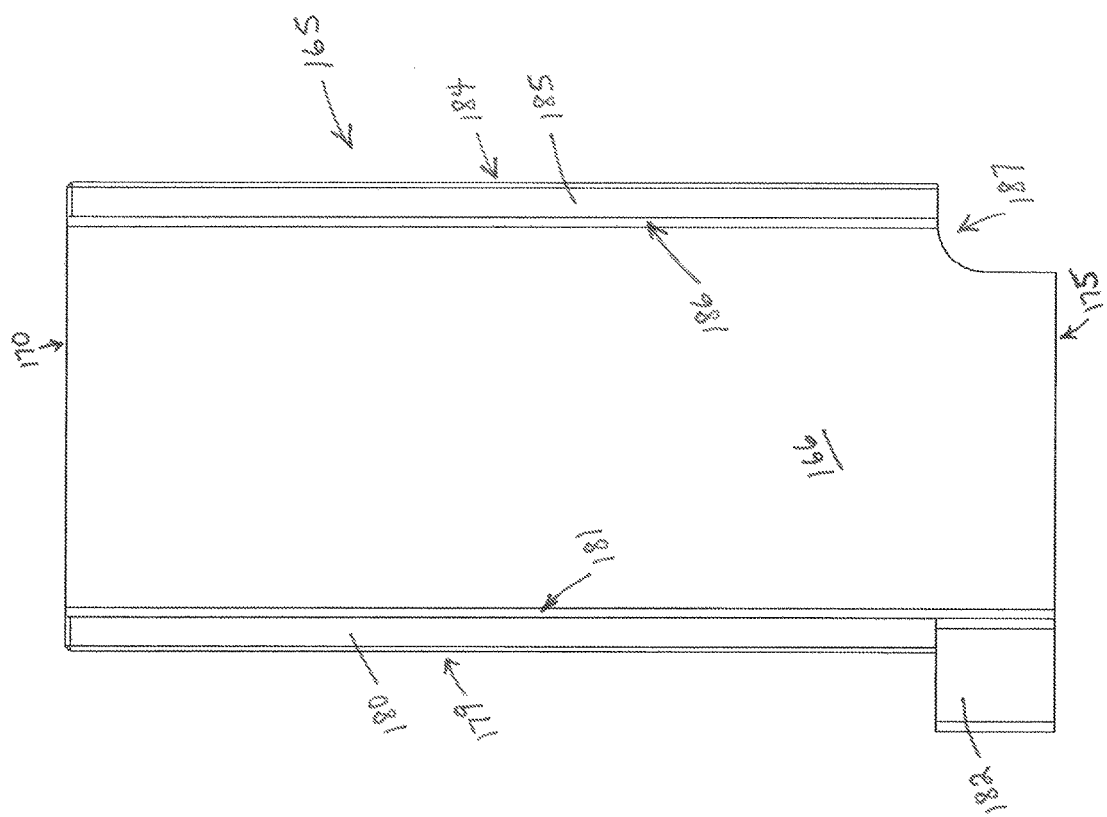
FIG. 18 is a front view of the fiber holder support shown in FIG. 17.
Figure 19:
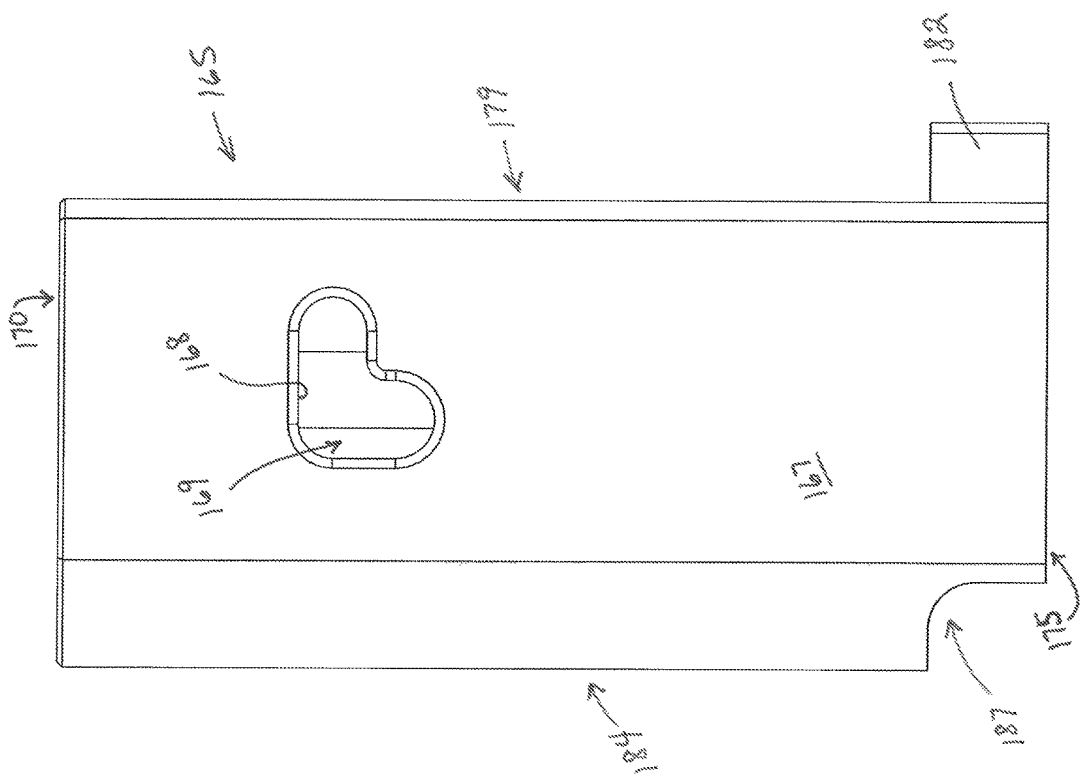
FIG. 19 is a rear view of the fiber holder support shown in FIG. 17.
Figure 20:
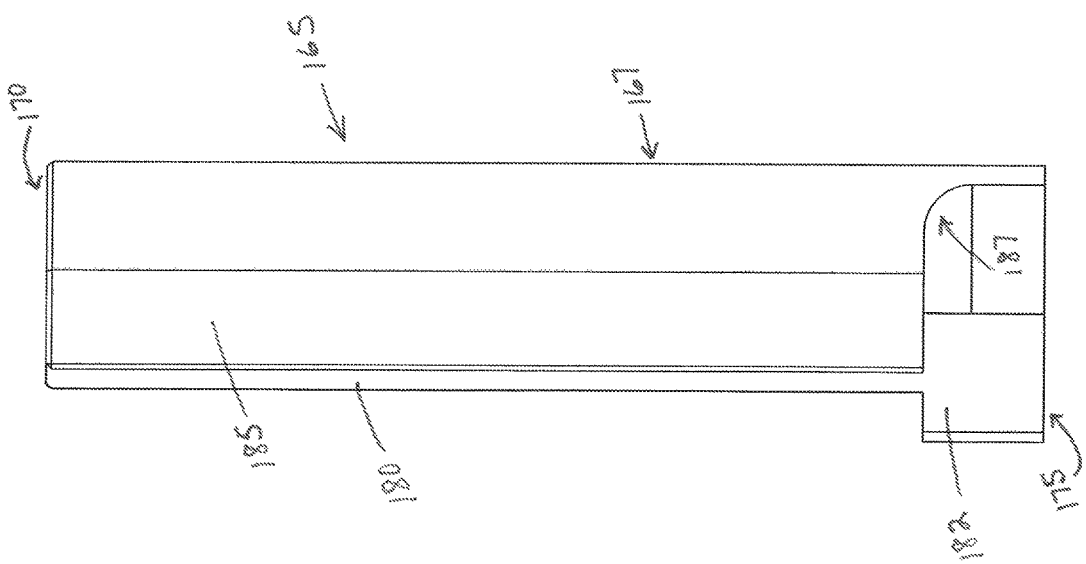
FIG. 20 is a first side view of the fiber holder support shown in FIG. 17.
Figure 31:
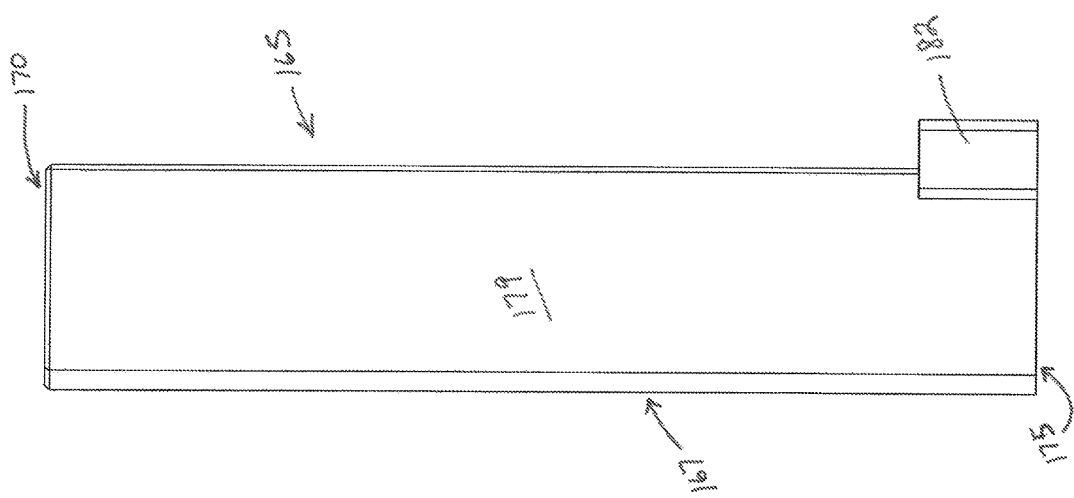
FIG. 31 is a rear view of the optical fiber laser cleaver adapter assembly shown in FIG. 1.

The indexing guide 135 is shown in FIGS. 10-16. The indexing guide 135 includes an opening 136 and, when inserted into the channel or receiving slot 132 of the base 101, the opening 136 aligns with the window 103 and notch 119. Within the opening 136, a divider plate 144 defines slots and dividers. It is understood that any suitable number of slots could be defined. As shown in FIGS. 13, 14, and 16, a first divider 137 extends downward from a rear side of a first slot 140 having a wider portion 140a and a narrower portion 140b, a second divider 138 extends downward from a rear side of a second slot 141 having a wider portion 141a and a narrower portion 141b, a third divider 139 extends downward from a rear side of a third slot 142 having a wider portion 142a and a narrower portion 142b, and a protrusion 145 extends downward from a rear side of a fourth slot 143 having a wider portion 143a and a narrower portion 143b. Between the opening 136 and the rear side are indexing apertures and between the opening 136 and the front side are indicators, which help position the indexing guide 135 in the desired position relative to the base 101. The indexing apertures include a first indexing aperture 147 proximate the opening, a second indexing aperture 148, a third indexing aperture 149, and a fourth indexing aperture 150 proximate the rear side. The indicators each include, for example, a score line and a numeral, but it is recognized any suitable types of indictors could be used. In this example, the indicators include a first indicator 152 proximate the front side, a second indicator 153, a third indicator 154, and a fourth indicator 155 proximate the opening 136. A threaded aperture 157 extends through the indexing guide proximate the front side and corresponds with the handle receiver 109 in the base 101. A handle 159 includes a shaft with a threaded portion 160 that mates with the threaded aperture 157 and a knob 161.

The fiber holder 165 is shown in FIGS. 17-23. A front 166, a rear 167, a top 170, and a bottom 175 form a cavity 169 therebetween. The rear 167 includes a generally sideways L-shaped slot 168 proximate the top 170. The top 170 includes a center aperture 171. On one side of the center aperture 171 are an intermediate threaded aperture 172a and an outer aperture 173a. On the other side of the center aperture 171 are an intermediate threaded aperture 172b and an outer aperture 173b. The bottom 175 includes apertures that correspond with the apertures in the top 170. A center aperture 176 corresponds with the center aperture 171, an intermediate threaded aperture 177a corresponds with the intermediate threaded aperture 172a, an intermediate threaded aperture 177b corresponds with the intermediate threaded aperture 172b, an outer aperture 178a corresponds with the outer aperture 173a, and an outer aperture 178b corresponds with the outer aperture 173b. The center apertures 171 and 176 form a bore therebetween. A first flange 180 extends outward from side 179, and a groove 181 is proximate the juncture of the first flange 180 and the side 179. Proximate the bottom or the first flange 180, an extension portion 182 extends outwardly therefrom. The extension portion 182 includes an aperture 183. A second flange 185 extends outward from side 184, and a groove 186 is proximate the juncture of the second flange 185 and the side 184. The bottoms of the second flange 185 and the rear 167 form a notch 187.

The holder 165 is operatively connected to the base 101. The holder 165 is positioned on the ramped portion 102a with a dowel 190a extending into outer aperture 178a of the holder 165 and into the outer aperture 106a of the base, a dowel 190b extending into outer aperture 178b of the holder 165 and into the outer aperture 106b of the base, a fastener 192a extending through the intermediate aperture 105a of the base 101 into the intermediate threaded aperture 177a of the holder 165, and a fastener 192b extending through the intermediate aperture 105b of the base 101 into the intermediate threaded aperture 177b of the holder 165. A fastener 188 is inserted through the aperture 183 of the holder's extension portion 182 and into the side threaded aperture 107 of the base 101.

Figure 2:
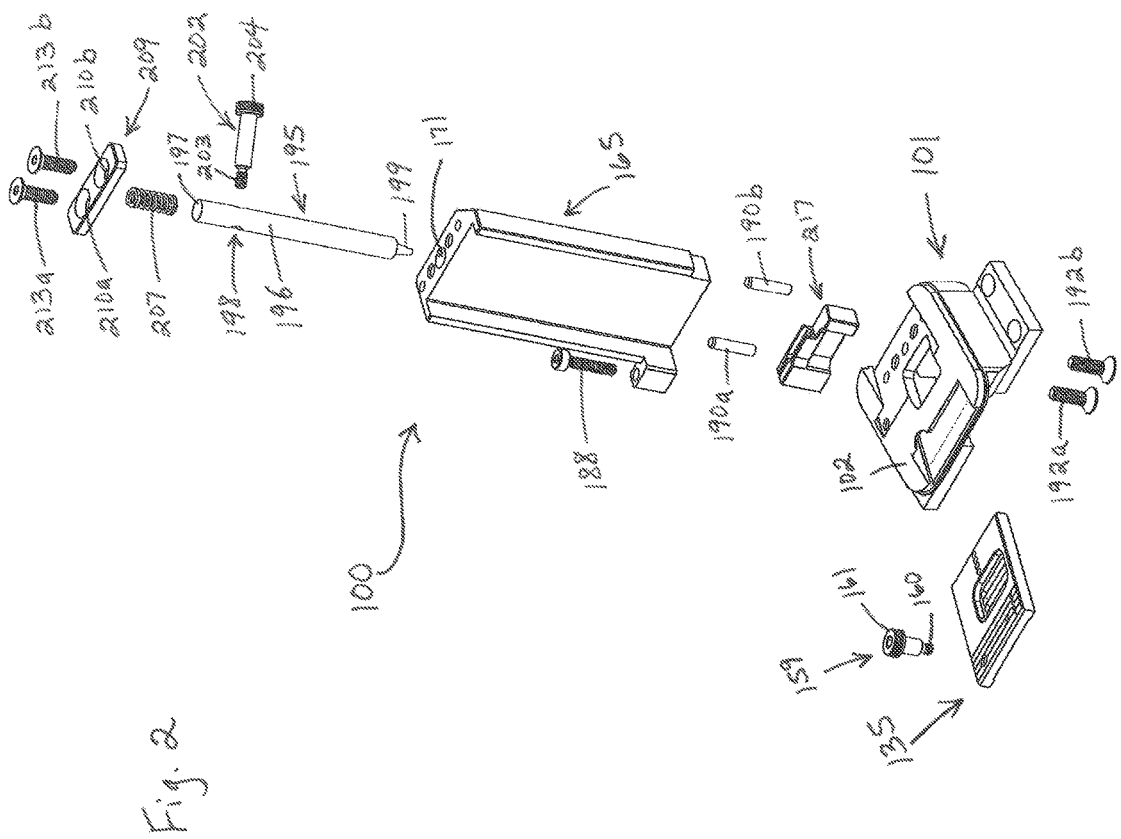
FIG. 2 is a front exploded perspective view of the optical fiber laser cleaver adapter assembly shown in FIG. 1.
Figure 3:
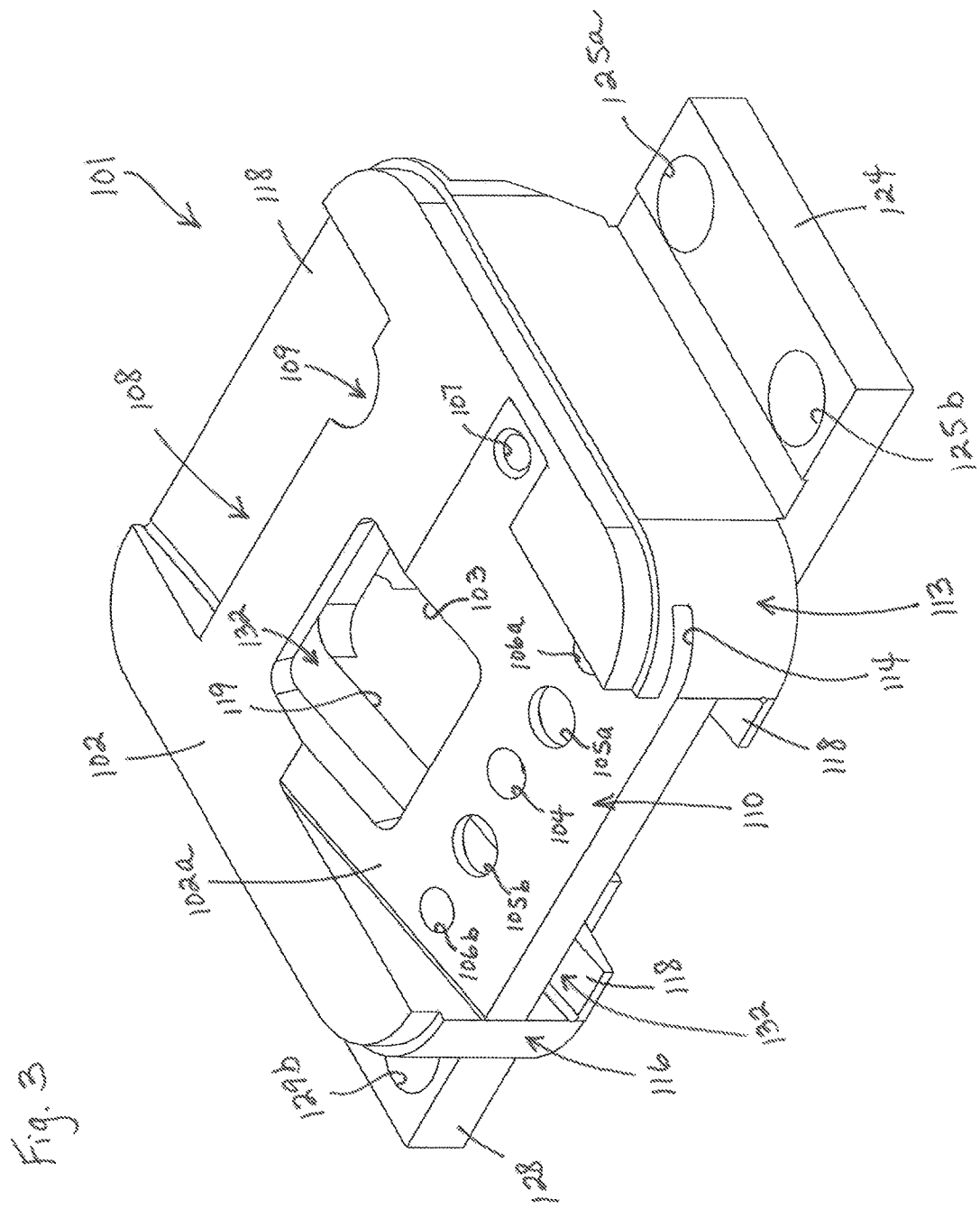
FIG. 3 is a rear perspective view of a base of the optical fiber laser cleaver adapter assembly shown in FIG. 1.
Figure 4:
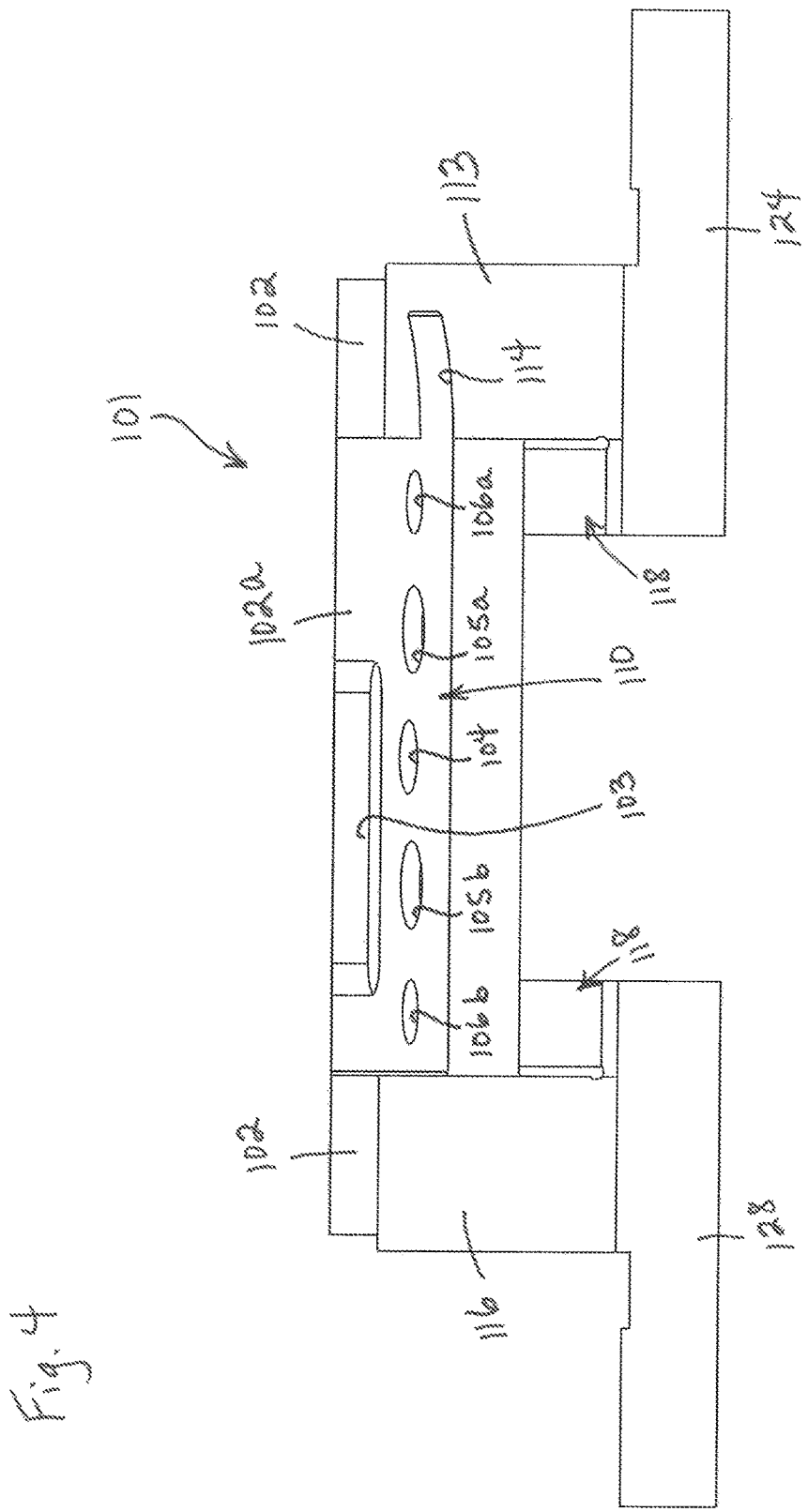
FIG. 4 is a rear view of the base shown in FIG. 3.
Figure 5:
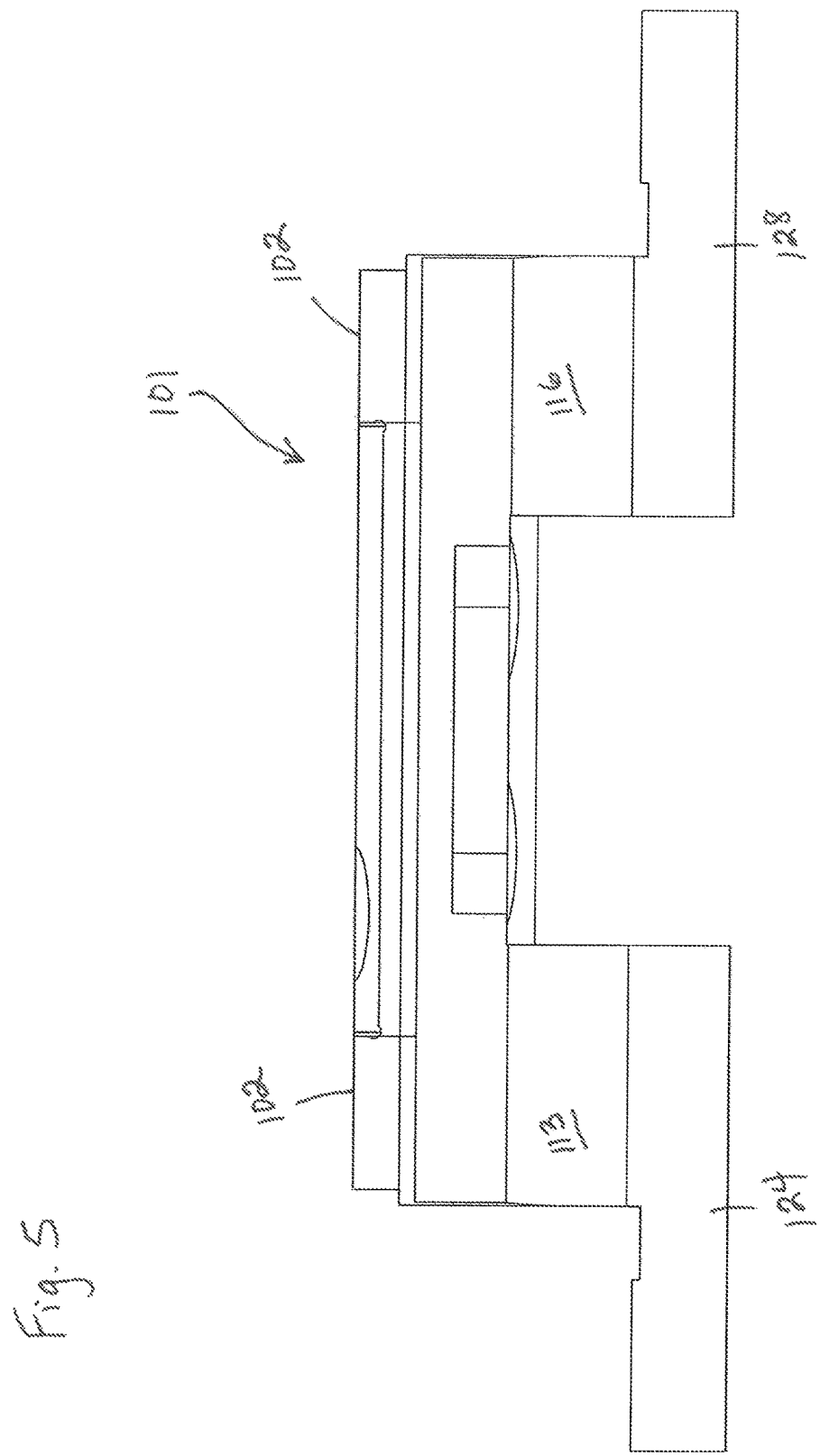
FIG. 5 is a front view of the base shown in FIG. 3.
Figure 6:
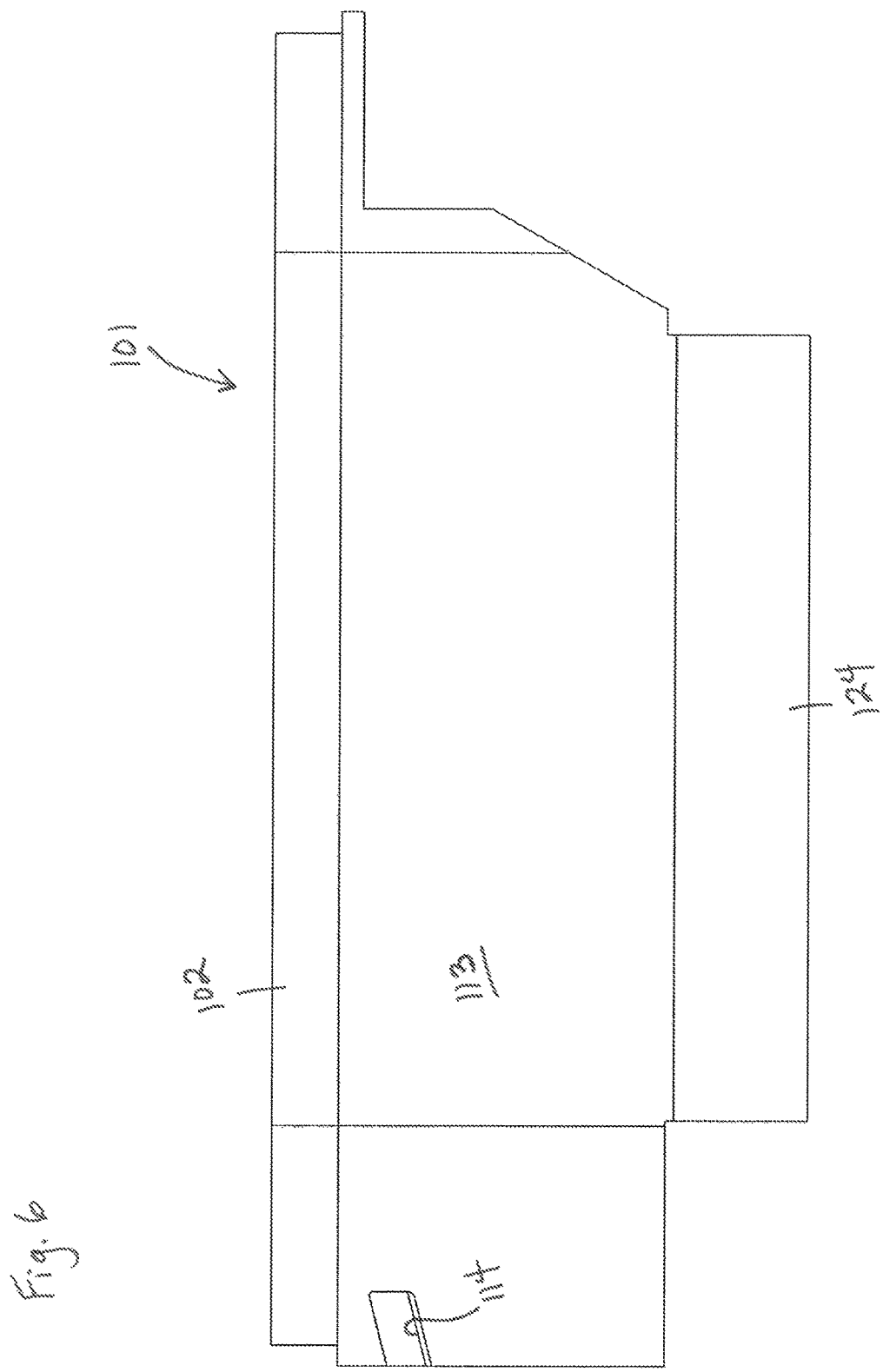
FIG. 6 is a first side view of the base shown in FIG. 3.
Figure 7:
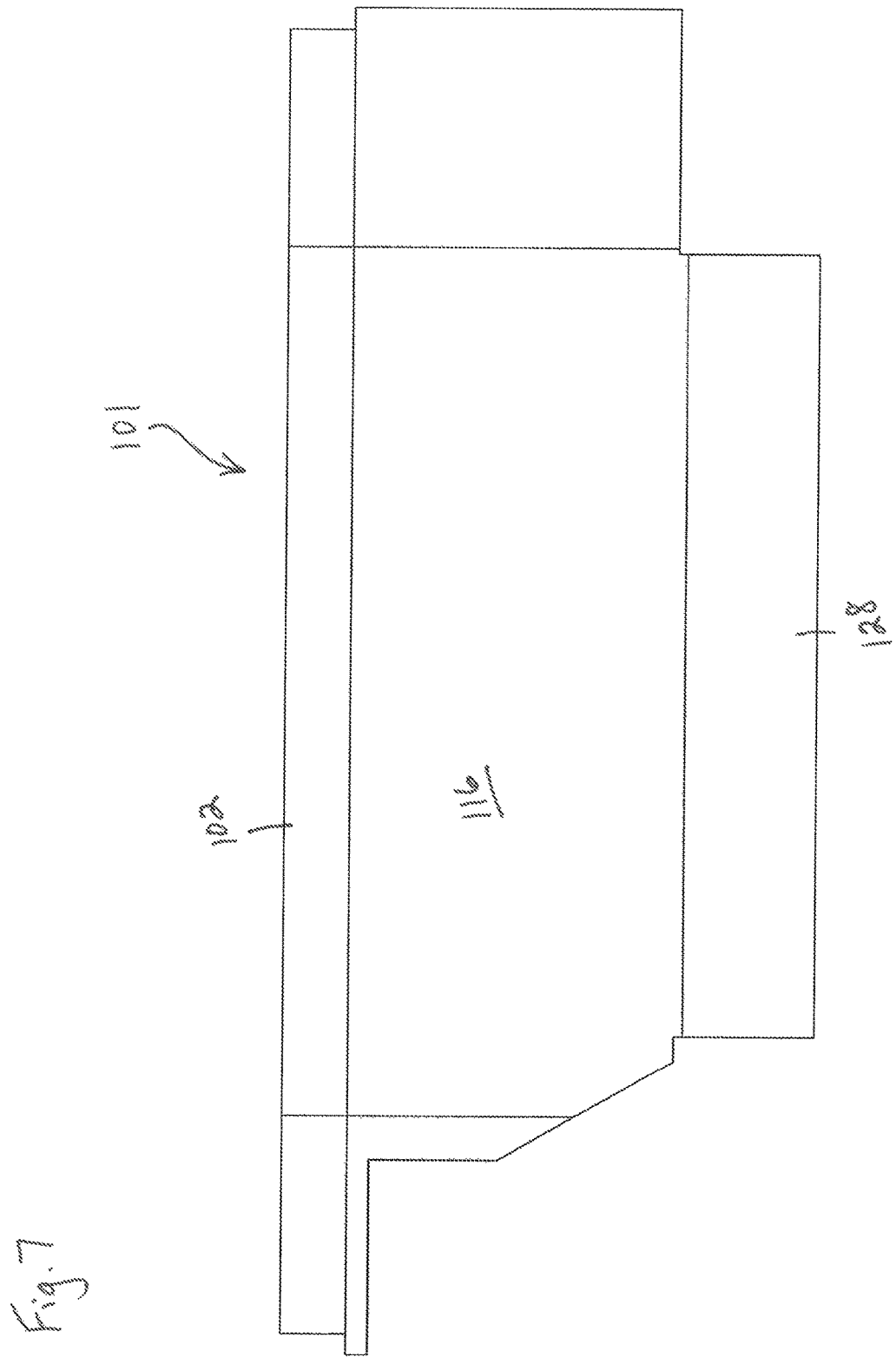
FIG. 7 is a second side view of the base shown in FIG. 3.
Figure 8:
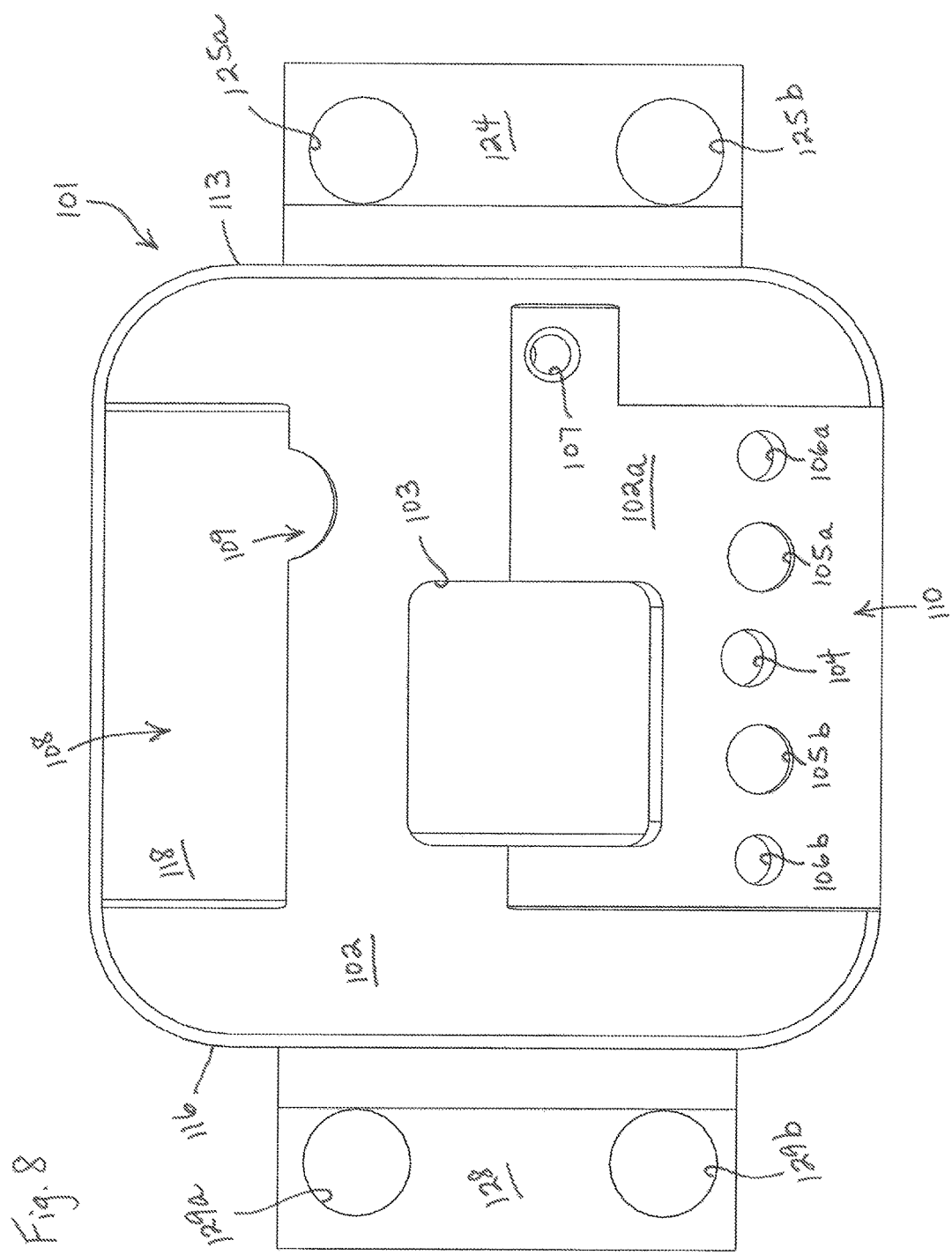
FIG. 8 is a top view of the base shown in FIG. 3.
Figure 9:
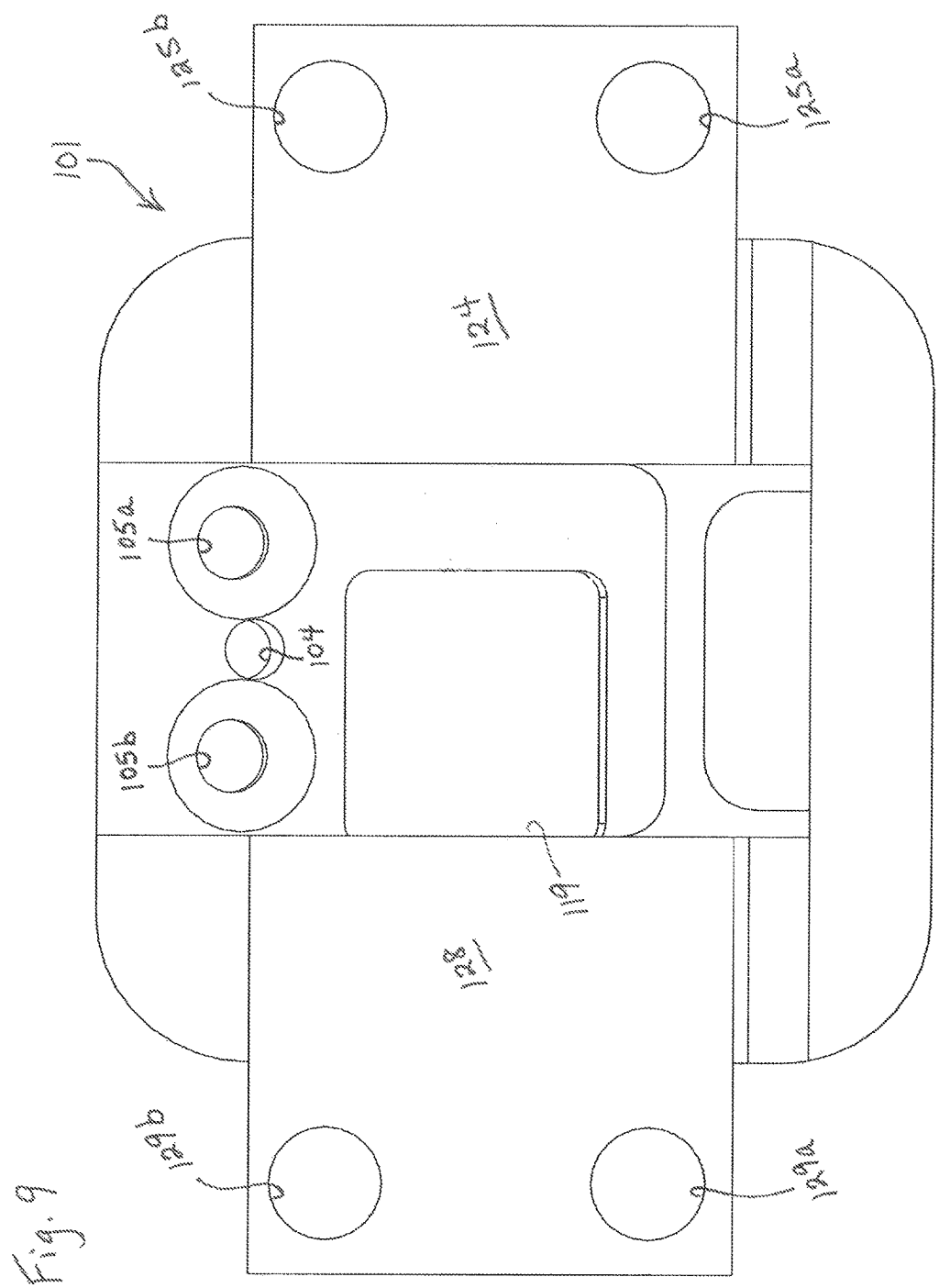
FIG. 9 is a bottom view of the base shown in FIG. 3.
Figure 10:
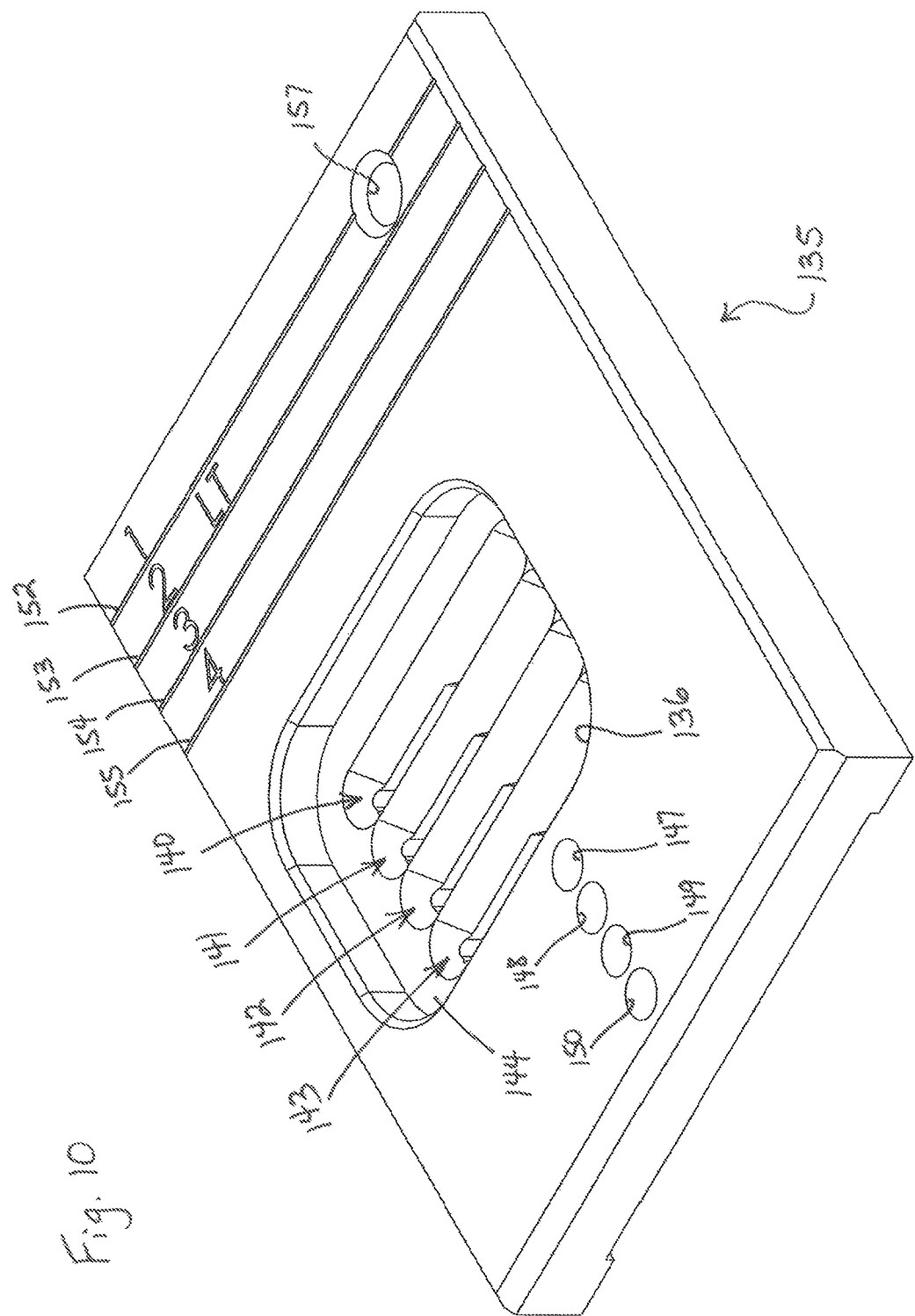
FIG. 10 is a rear perspective view of an indexing guide of the optical fiber laser cleaver adapter assembly shown in FIG. 1.
Figure 11:
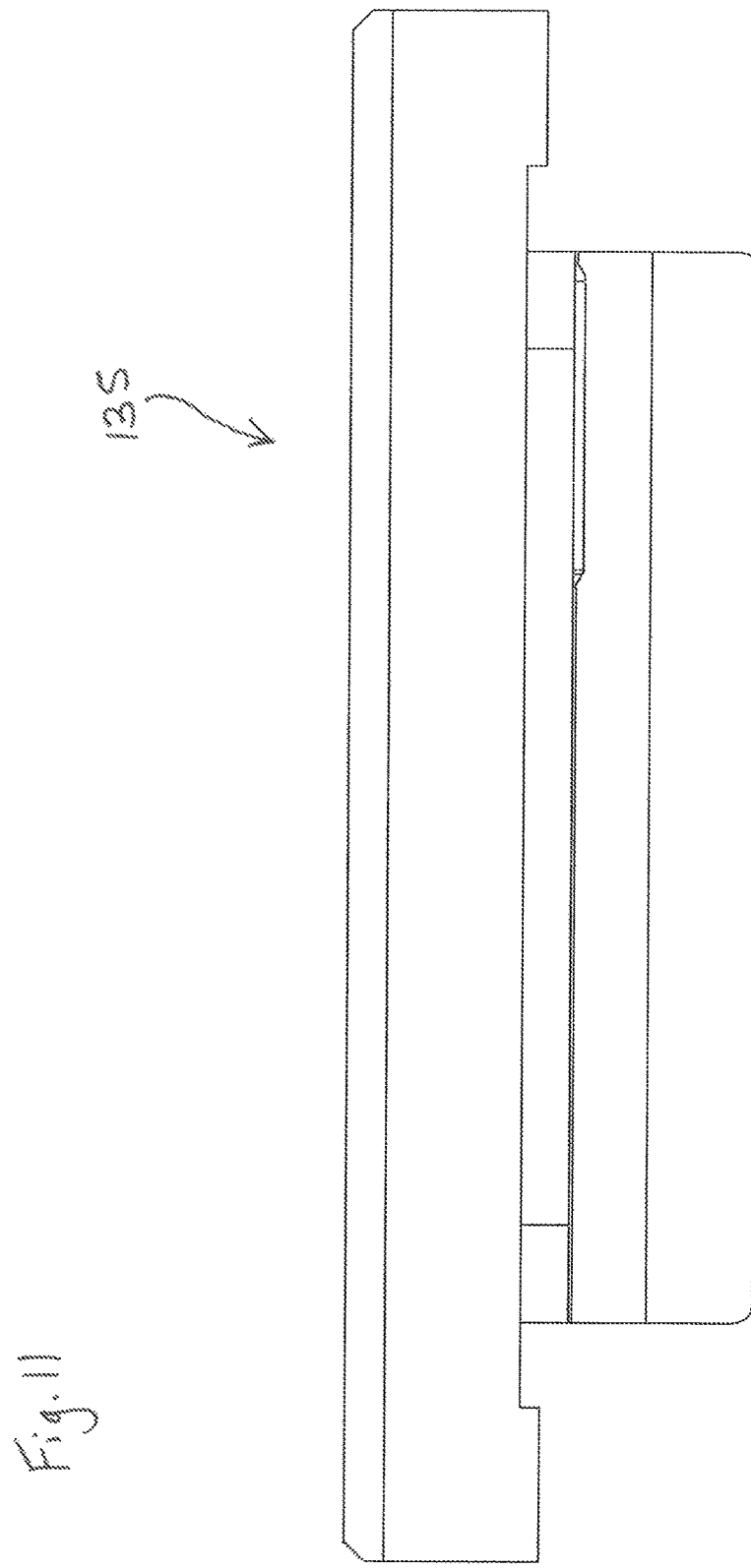
FIG. 11 is a rear view of the indexing guide shown in FIG. 10.
Figure 12:
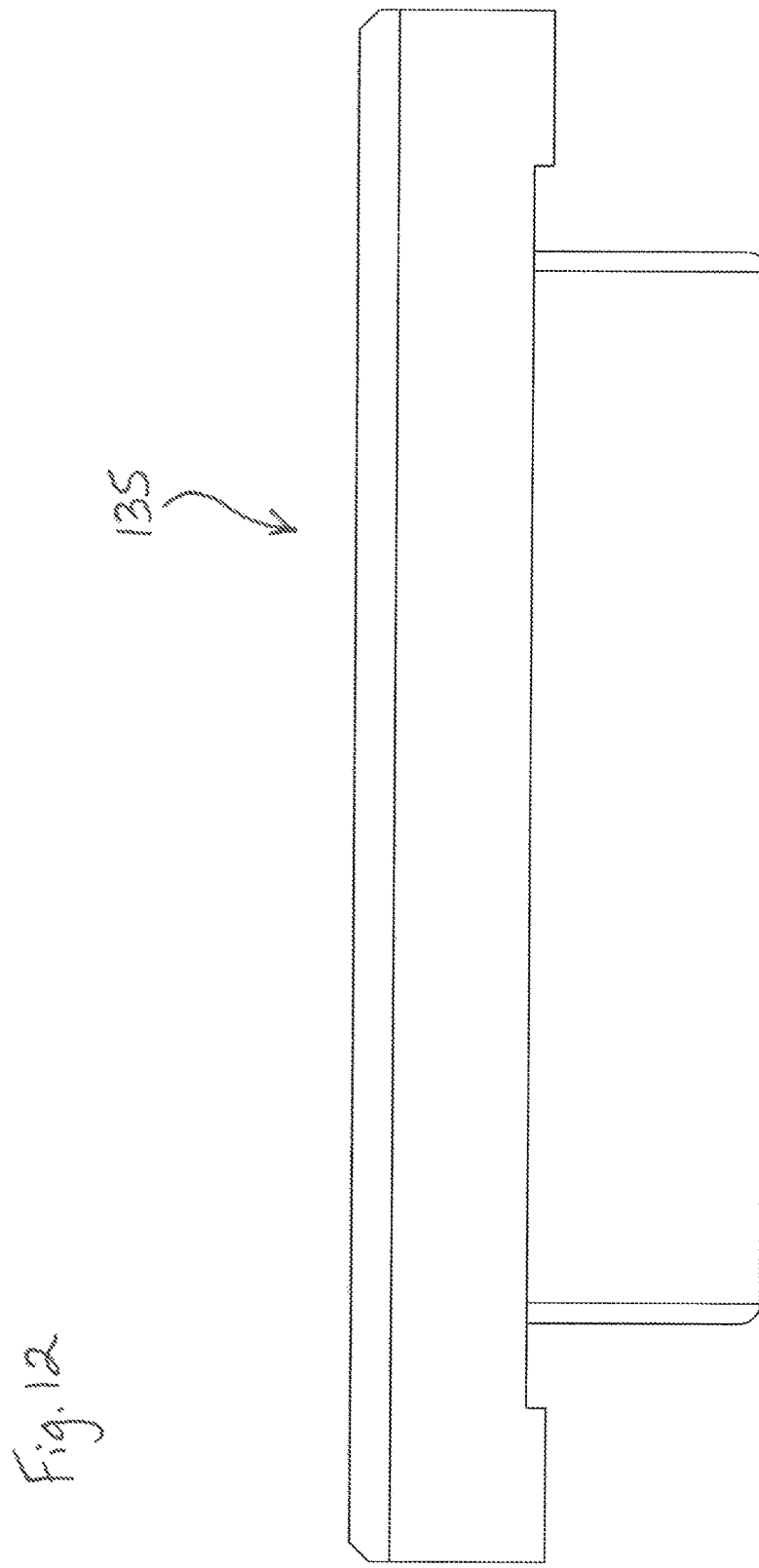
FIG. 12 is a front view of the indexing guide shown in FIG. 10.

The positioning member 195 is shown in FIG. 2. The positioning member 195 includes a shaft 196 having a top 197 and a lateral bore 198 extending through the shaft 196 proximate the top 197, and an engaging portion 199 extending downward from the bottom. The shaft 196 is configured and arranged to be received within the bore between the center apertures 171 and 176 of the holder support 165. The engaging portion 199 is preferably tapered and configured and arranged to be received by the indexing apertures of the indexing guide 135. A handle 202 includes a shaft with a threaded portion 203 on one end and a knob 204 on the other end. The shaft is configured and arranged to extend through the slot 168 of the holder 165. The threaded portion 203 mates with the lateral bore 198. A biasing member 207 is positioned within the bore between apertures 171 and 176 proximate the top of the shaft 197. A plate 209 secures the biasing member 207 within the bore. The plate 209 includes apertures 210a and 210b corresponding with intermediate threaded apertures 172a and 172b in the holder 165, and fasteners 213a and 213b extend through the apertures 210a and 210b into the intermediate threaded apertures 172a and 172b, respectively, to secure the plate 209 to the holder 165 thereby securing the positioning member 195 and the biasing member 207 to the holder 165.

A block 217 could be used in some instances, for example, it could be used with the Prizm MT fiber handler designs 16513 and 16514. The block 217 is not needed for the Prizm LT fiber handler design or possibly other designs. The block 217 is shown in FIGS. 24-30. The block 217 includes a top 218 from which an extension 219a and an extension 219b extend proximate a first side 224 to form a channel 220 having a wider portion 220a and a narrower portion 220b. The wider portion 220a is proximate a second side 226, and the narrower portion 220b is proximate the first side 224. The front of the block 217 forms a notched portion 221. A bottom 222 includes an aperture 223a proximate the first side 224 and an aperture 223b proximate the second side 226. As shown in FIG. 30, the notched portion 221 is positioned between the apertures 223a and 223b. The notched portion 221 provides clearance for the fibers when the fibers are in the first position. The apertures in the block 217 have magnets secured therein, for example with epoxy, to releasably connect the block 217 to the holder support 165. The first side 224 includes an aperture 225a proximate below the channel 220 and an aperture 225b below the aperture 225a. A rear 227, shown in FIG. 26, includes an aperture 228a proximate the first side 224 and an aperture 228b proximate the second side 226. The block 217 is configured and arranged to be positioned proximate the ramped portion 102a of the base 101 and the front 166 of the holder support 165.

Figure 36:
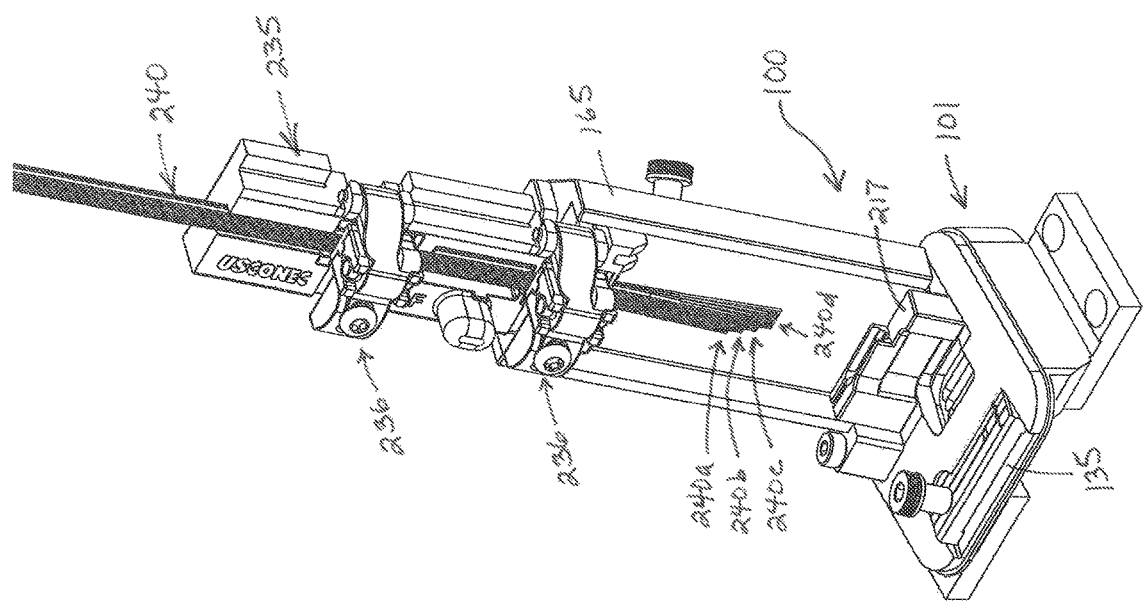
FIG. 36 is a front perspective view of the optical fiber laser cleaver adapter assembly shown in FIG. 1 with an optical fiber cable assembly connected thereto.

A fiber handler 235, which is well known in the art, includes latches 236 and is configured and arranged to engage fiber ribbons or stranded fibers. As shown in FIGS. 36-38, the fiber handler 235 engages fiber ribbons 240, which in this example include a first row 240a, a second row 240b, a third row 240c, and a fourth row 240d.

In operation, the ribbons or stranded optical fibers are cut to a desired length. For stranded optical fibers, the individual strands are separated into sub-groups and ribbonized per the required color order. The ribbons 240 are held in a fiber handler 235 and the cladding is stripped to a desired length. An example of a suitable thermal stripper is Fujikura part# HJS-02. To aid in loading the fibers in the adapter assembly, the lengths of the ribbons in the rows may vary. For example, if there are four rows of ribbons, the rows could be stripped 13 mm in length, 11 mm in length, 9 mm in length, and 7 mm in length. There are a variety of fiber holders 235 that could be used depending upon the types of optical fibers being used. Examples of fiber holders that could be used include Fujikura FH-12 and US Conec 13926, 13668, 13923, and 13591.

For example, for PRIZM™ MT ferrules, the ribbons 240 could be transferred to a US Conec fiber handler, such as 16513 for 12 fiber ribbons and 16514 for 16 fiber ribbons. The ribbons 240 are placed in the fiber handler 235 and the latches 236 are partially closed. Prior to securing the latches 236, it should be determined that the ribbon 240 is approximately 9 mm from the exit point on the fiber handler 235.

To cleave the fibers of the ribbons 240 to the desired length, the positioning member 195 is placed in an unlocked position, and the indexing guide 135 is slid into position so that the fourth indicator 155 is aligned proximate the edge of the window 103 of the base 101.

The fiber handler 235 is placed on the base 101 to the right side with the bare fibers facing down. This will align the fibers with the wider portions of the slots 140, 141, 142, and 143 of the indexing guide 135. The fiber handler 235 is slid down so the bottom row (the longest row of ribbons) 240d engages the indexing guide 135 but keeping the shorter rows above the indexing guide 135. The indexing guide 135 is slid to the next position (third indicator 154) and this is repeated until all the ribbons 240 are in their respective slots. The fiber handler 235 is slid down until it contacts the block 217. The indexing guide 135 is slid linearly from one position to the next position.

The indexing guide 135 is positioned so it is centered between the second and third indicators 153 and 154. The fiber handler 235 is slid to the left so the fibers slide into the narrower portions of the slots 140, 141, 142, and 143 in the indexing guide 135. The horizontal shaft of the fiber handler 235 will locate in the slot of the block 217. The fiber handler 235 is slid until it contacts the left edge of the fiber holder slide, which is formed by the front 166 and the flanges 180 and 185 of the holder 165.

The indexing guide 135 is slid to the first location that has fiber in it. For example, if there are four rows of ribbons 240, the first location will be first indicator 152; if there are only two rows, the first location will be third indicator 154. The indexing guide 135 is locked in location with the positioning member 195 by moving it to the lock position, which is the lower portion of the slot 168. The beam height is set on the laser cleaver and the laser is actuated to cut the first row of fibers. The laser will cut the first row and then be deflected away by the 60° angled surface 137, 138, 139, or 145 on the indexing guide 135, acting as a protective shield, protecting the rows of fibers behind it relative to the laser.

The indexing guide 135 is released by disengaging the positioning member 195. The positioning member 195 is biased in a lock position by the biasing member 207, which exerts a downward force on the positioning member 195 and positions the handle 202 in the lower portion of the slot 168. To disengage the positioning member 195, the force of the biasing member 207 is overcome by moving the handle 202 within the slot 168 upward and to the side thereby moving the positioning member 195 upward and positioning the handle 202 in the side portion of the slot 168, which is an unlock position. The indexing guide 135 is moved to the next position and the positioning member 195 is moved into the lock position. When the indexing guide 135 is moved, the fibers move within their respective slots. The first row of cleaved fibers is flexed up and away from the laser beam path and positions the next row of fibers. The rest of the rows of fibers behind are now protected by the next 60° angled surface on the indexing guide 135. The beam height is set on the laser cleaver for the second row and the laser is actuated to cut the second row of fibers. These steps are repeated until all of the rows of fibers have been cleaved.

After all of the rows of fibers have been cleaved, the positioning member 195 is placed in an unlocked position. The indexing guide 135 is positioned so it is centered between the second and third indicators 153 and 154. The fiber handler 235 is slid to the right so the fibers slide into the wider portions of the slots 140, 141, 142, and 143 in the indexing guide 135. The fiber handler 235 is moved straight up the slide of the fiber holder 165 and the fibers are ready for assembly of the PRIZM™ MT ferrule.

The above specification, examples, and data provide a complete description of the manufacture and use of the composition of embodiments of the invention. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the invention. Therefore, it is manifestly intended that this invention be limited only by the claims and the equivalents thereof.

The invention claimed is:

1. An optical fiber laser cleaver adapter assembly configured and arranged to receive at least two rows of optical fiber cables, comprising:
   a base having a length and a width;
   an indexing guide selectively connected to the base between at least a first position and a second position, the indexing guide configured and arranged to move linearly along the length of the base to move between the at least first and second positions, the indexing guide having an opening and at least one divider separating the opening into at least a first slot and a second slot; and
   a fiber holder support operatively connected to the base, the fiber holder support configured and arranged to receive the at least two rows of optical fiber cables and position the at least two rows of optical fiber cables to extend through the respective at least first and second slots.

2. The optical fiber laser cleaver adapter assembly of claim 1, wherein the fiber holder support is configured and arranged to position the indexing guide in at least a first position and a second position relative to the base thereby positioning the at least two rows of optical fiber cables to extend through the respective at least first and second slots, the first position positioning the first slot and thereby the first row of optical fiber cables in a desired location, the second position positioning the second slot and thereby the second row of optical fiber cables in the desired location.

3. The optical fiber laser cleaver adapter assembly of claim 1, wherein the base has a receiving slot configured and arranged to receive the indexing guide.

4. The optical fiber laser cleaver adapter assembly of claim 1, further comprising:
   a block operatively connected to the base and configured and arranged to receive the optical fiber cables.

5. The optical fiber laser cleaver adapter assembly of claim 1, wherein the at least one divider extends downward and forms at least one protective shield for any rows of optical fiber cables positioned behind the at least one divider relative to a laser.

6. The optical fiber laser cleaver adapter assembly of claim 1, wherein the at least one divider includes a first divider, a second divider, and a third divider separating the opening into a first slot, a second slot, a third slot, and a fourth slot.

7. The optical fiber laser cleaver adapter assembly of claim 6, wherein the at least two rows of optical fiber cables includes a first row, a second row, a third row, and a fourth row, each of the slots receiving a respective row of optical fiber cables.

8. An optical fiber laser cleaver adapter assembly configured and arranged to receive at least two rows of optical fiber cables, comprising:
   an indexing guide having an opening and at least one divider separating the opening into at least a first slot and a second slot;
   a base configured and arranged to receive the indexing guide, the base having a window allowing access to at least a portion of the opening of the indexing guide; and
   a fiber holder support operatively connected to the base, the fiber holder support configured and arranged to receive the at least two rows of optical fiber cables and position the at least two rows of optical fiber cables to extend through the window and the respective at least first and second slots, wherein the indexing guide moves relative to the base between at least a first position and a second position and movement of the indexing guide and thereby the optical fiber cables is linear along the base, wherein the first row of optical fiber cables is flexed up and away from a laser beam path when the indexing guide is in the second position.

9. An optical fiber laser cleaver adapter assembly configured and arranged to receive at least two rows of optical fiber cables, comprising:
   an indexing guide having an opening and at least one divider separating the opening into at least a first slot and a second slot;
   a base configured and arranged to receive the indexing guide;
   a fiber holder support operatively connected to the base, the fiber holder support configured and arranged to receive the at least two rows of optical fiber cables and position the at least two rows of optical fiber cables to extend through the respective at least first and second slots; and
   a positioning member moveably connected to the fiber holder and having a lock position and an unlock position, the lock position locking the indexing guide relative to the base, the unlock position allowing movement of the indexing guide and thereby the optical fiber cables extending through the at least first and second slots relative to the base.

10. The optical fiber laser cleaver adapter assembly of claim 9, wherein the positioning member is biased in the lock position.

11. An optical fiber laser cleaver adapter assembly configured and arranged to receive at least two rows of optical fiber cables, comprising:
    a base having a length and a width;
    an indexing guide selectively connected to the base between at least a first position and a second position, the indexing guide configured and arranged to move linearly along the length of the base to move between the at least first and second positions, the indexing guide having an opening and at least one divider separating the opening into at least a first slot and a second slot; and
    a fiber holder support operatively connected to the base and configured and arranged to selectively position the indexing guide in at least the first position and the second position relative to the base, the fiber holder support configured and arranged to receive the at least two rows of optical fiber cables and position the at least two rows of optical fiber cables to extend through the respective at least first and second slots, the first position positioning the first slot and thereby the first row of optical fiber cables in a desired location, the second position positioning the second slot and thereby the second row of optical fiber cables in the desired location.

12. The optical fiber laser cleaver adapter assembly of claim 11, further comprising:
    a block operatively connected to the base and configured and arranged to receive the optical fiber cables.

13. The optical fiber laser cleaver adapter assembly of claim 11, wherein the at least one divider extends downward and forms at least one protective shield for any rows of optical fiber cables positioned behind the at least one divider relative to a laser.

14. The optical fiber laser cleaver adapter assembly of claim 11, wherein the base has a receiving slot configured and arranged to receive the indexing guide.

15. The optical fiber laser cleaver adapter assembly of claim 11, wherein the at least one divider includes a first divider, a second divider, and a third divider separating the opening into a first slot, a second slot, a third slot, and a fourth slot.

16. The optical fiber laser cleaver adapter assembly of claim 15, wherein the at least two rows of optical fiber cables includes a first row, a second row, a third row, and a fourth row, each of the slots receiving a respective row of optical fiber cables.

17. An optical fiber laser cleaver adapter assembly configured and arranged to receive at least two rows of optical fiber cables, comprising:
    an indexing guide having an opening and at least one divider separating the opening into at least a first slot and a second slot;
    a base configured and arranged to receive the indexing guide;
    a fiber holder support operatively connected to the base and configured and arranged to position the indexing guide in at least a first position and a second position relative to the base, the fiber holder support configured and arranged to receive the at least two rows of optical fiber cables and position the at least two rows of optical fiber cables to extend through the respective at least first and second slots, the first position positioning the first slot and thereby the first row of optical fiber cables in a desired location, the second position positioning the second slot and thereby the second row of optical fiber cables in the desired location; and
    a positioning member moveably connected to the fiber holder and having a lock position and an unlock position, the lock position locking the indexing guide relative to the base, the unlock position allowing movement of the indexing guide and thereby the optical fiber cables extending through the at least first and second slots relative to the base.

18. The optical fiber laser cleaver adapter assembly of claim 17, wherein the positioning member is biased in the lock position.

19. An optical fiber laser cleaver adapter assembly configured and arranged to receive at least two rows of optical fiber cables, comprising:
    an indexing guide having an opening and at least one divider separating the opening into at least a first slot and a second slot;
    a base configured and arranged to receive the indexing guide;
    a fiber holder support operatively connected to the base and configured and arranged to position the indexing guide in at least a first position and a second position relative to the base, the fiber holder support configured and arranged to receive the at least two rows of optical fiber cables and position the at least two rows of optical fiber cables to extend through the respective at least first and second slots, the first position positioning the first slot and thereby the first row of optical fiber cables in a desired location, the second position positioning the second slot and thereby the second row of optical fiber cables in the desired location, wherein the first row of optical fiber cables is flexed up and away from a laser beam path when the indexing guide is in the second position.

* * * * *